United States Patent [19]
Burges et al.

[11] Patent Number: 5,727,081
[45] Date of Patent: Mar. 10, 1998

[54] SYSTEM AND METHOD FOR AUTOMATED INTERPRETATION OF INPUT EXPRESSIONS USING NOVEL A POSTERIORI PROBABILITY MEASURES AND OPTIMALLY TRAINED INFORMATION PROCESSING NETWORKS

[75] Inventors: Christopher John Burges, Freehold; John Stewart Denker, Leonardo, both of N.J.

[73] Assignee: Lucent Technologies Inc., Murray Hill, N.J.

[21] Appl. No.: 286,147

[22] Filed: Aug. 4, 1994

Related U.S. Application Data

[63] Continuation-in-part of Ser. No. 816,415, Dec. 31, 1991, abandoned, and a continuation-in-part of Ser. No. 816,414, Dec. 31, 1991, abandoned.

[51] Int. Cl.$^6$ ............................................. G06K 9/72
[52] U.S. Cl. .......................... 382/229; 382/228; 382/177; 382/178; 382/179; 382/161
[58] Field of Search ............................. 382/229, 230, 382/231, 228, 226, 177, 178, 179, 156, 157, 159, 160, 161, 101, 102

[56] References Cited

U.S. PATENT DOCUMENTS

| | | | |
|---|---|---|---|
| 5,487,117 | 1/1996 | Burges et al. | 382/228 |
| 5,497,432 | 3/1996 | Nishida | 382/229 |

*Primary Examiner*—Leo Boudreau
*Assistant Examiner*—Phuoc Tran

[57] ABSTRACT

A method and system for forming an interpretation of an input expression, where the input expression is expressed in a medium, the interpretation is a sequence of symbols, and each symbol is a symbol in a known symbol set. In general, the system processes an acquired input data set representative of the input expression, to form a set of segments, which are then used to specify a set of consegmentations. Each consegmentation and each possible interpretation for the input expression is represented in a data structure. The data structure is graphically representable by a graph comprising a two-dimensional array of nodes arranged in rows and columns and selectively connected by directed arcs. Each path, extending through the nodes and along the directed arcs, represents one consegmentation and one possible interpretation for the input expression. All of the consegmentations and all of the possible interpretations for the input expression are represented by the set of paths extending through the graph. For each row of nodes in the graph, a set of scores is produced for the known symbol set, using a complex of optimally trained neural information processing networks. Thereafter the system computes an a posteriori probability for one or more symbol sequence interpretations. By deriving each a posteriori probability solely through analysis of the acquired input data set, highly reliable probabilities are produced for competing interpretations for the input expression.

37 Claims, 15 Drawing Sheets

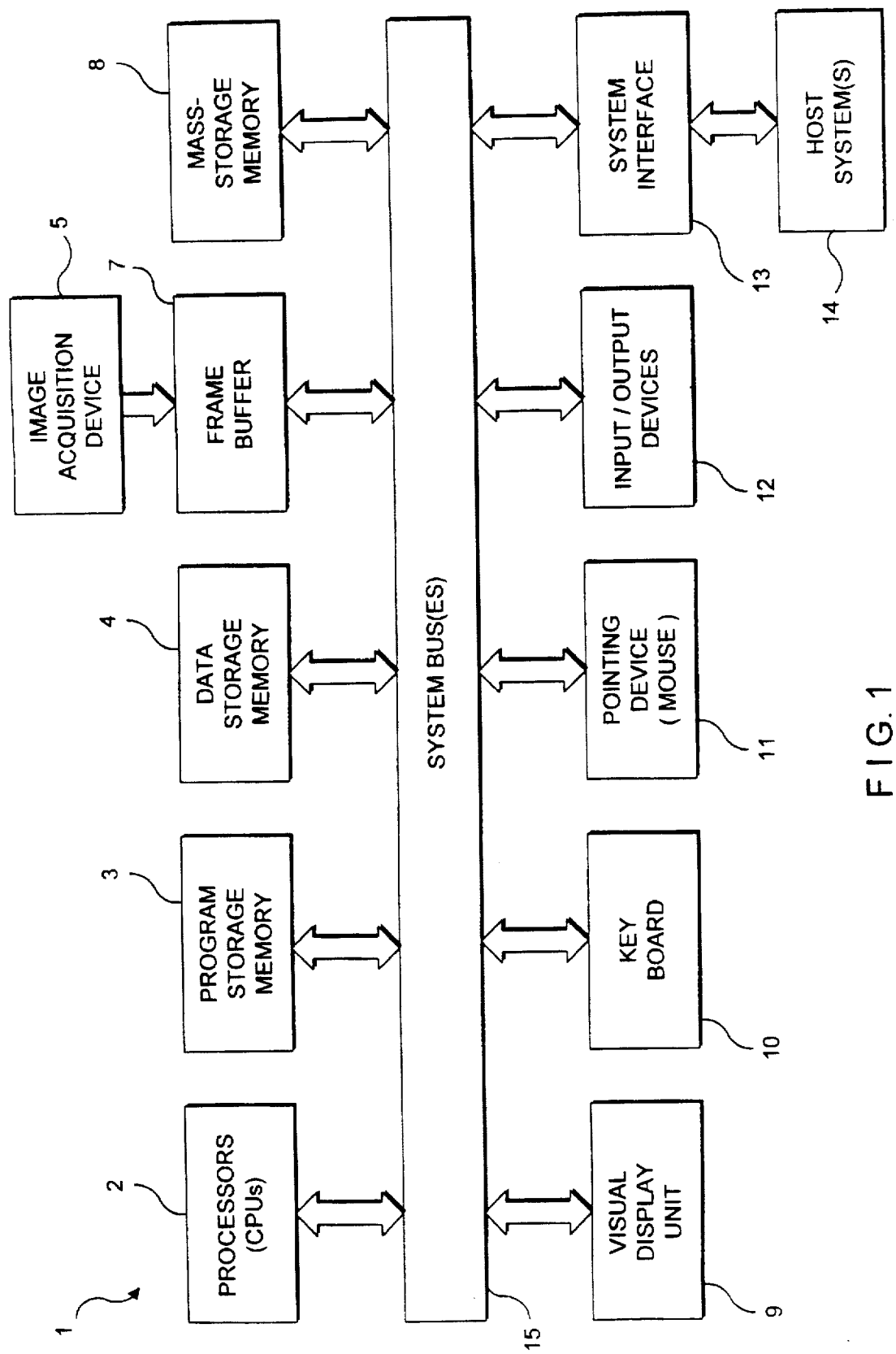
F I G. 1

|3|5|7|3|3|    FIG. 4C

|3|5|7|3|3|    FIG. 4D

*FIG. 4D*

|3|5|7|3|3|    FIG. 4E

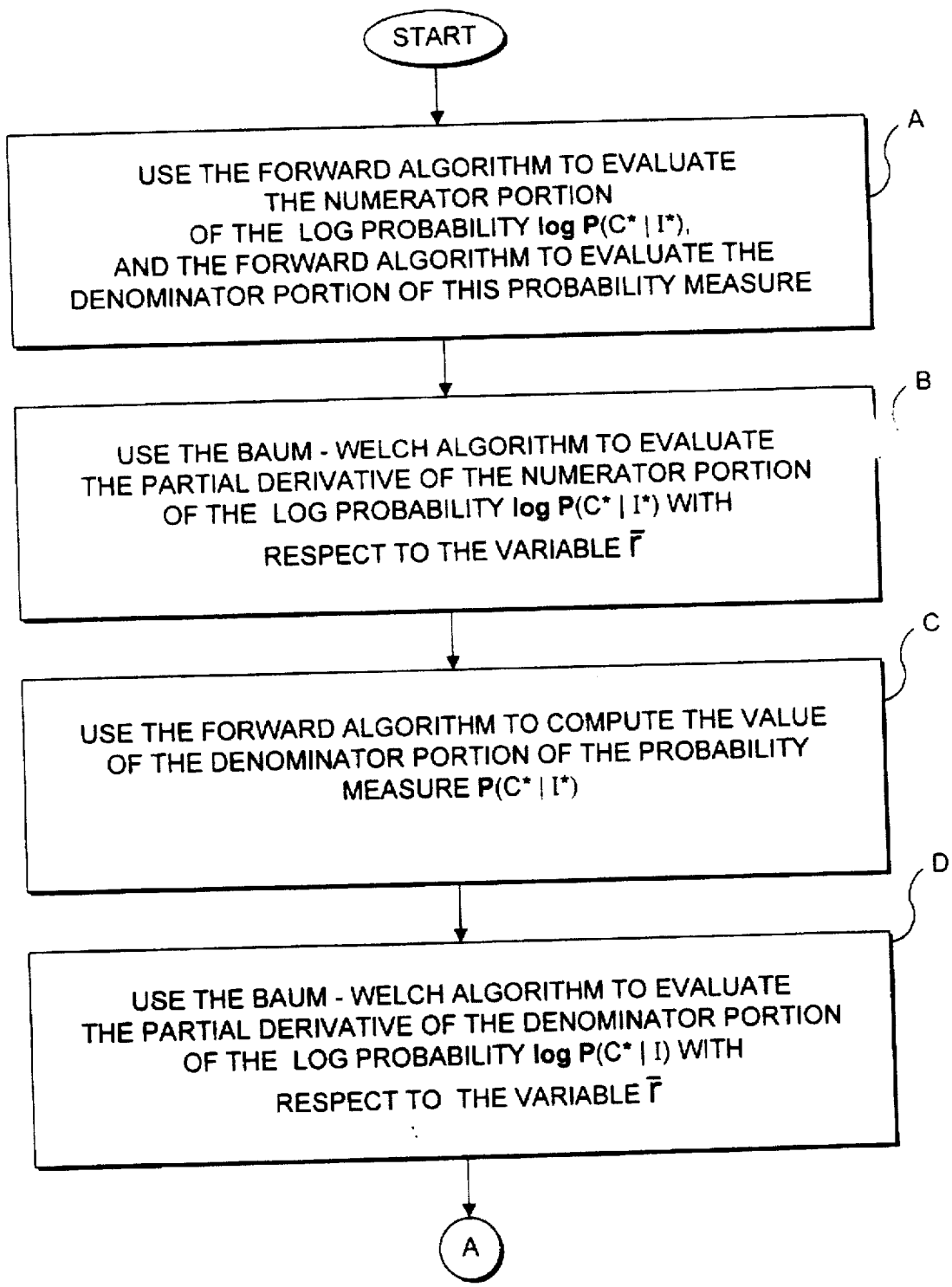
F I G. 13A

SYSTEM AND METHOD FOR AUTOMATED INTERPRETATION OF INPUT EXPRESSIONS USING NOVEL A POSTERIORI PROBABILITY MEASURES AND OPTIMALLY TRAINED INFORMATION PROCESSING NETWORKS

RELATED CASES

This is a Continuation-in-Part of application Ser. No. 07/816,415, abandoned, entitled "Graphical System For Automated Segmentation and Recognition For Image Recognition Systems," application Ser. No. 07/816,414, abandoned, entitled "Alphanumeric Image Segmentation Scheme" both filed Dec. 31, 1991, by Applicants, and which are incorporated herein by reference.

BACKGROUND OF THE INVENTION

1. Field Of The Invention

The present invention generally relates to an automated method and system for interpreting input expressions, such as handwritten characters, utilizing novel a posteriori probability measures and optimally trained neural information processing networks.

2. Brief Description Of The Prior Art

Presently, there is great commercial interest in building machines that can correctly interpret (i.e., recognize) strings of possibly connected alphanumeric characters recorded on various medias. For example, the U.S. Postal Service will soon rely extensively on such machines in order to correctly recognize handwritten ZIP Codes on pieces of mail during its mail sorting and routing operations across the country.

Presently, a number of prior art character recognition systems have been developed for use in various environments. A variety of such systems and related techniques are described in the following technical publications:

Y. Le Cun, B. Boser, J. S. Denker, D. Henderson, R. E. Howard, W. Hubbard, and L. D. Jackel, "Handwritten Digit Recognition with a Back-Propagation Network", pp. 396–404 in *Advances in Neural Information Processing* 2, David Touretzky, ed., Morgan Kaufman (1990);

J. S. Bridle, "Probabilistic Interpretation of Feedforward Classification Network Outputs, with Relationships to Statistical Pattern Recognition", in *Neuro-computing: Algorithms, Architectures and Applications*, F. Fogelman and J. Hérault, ed., Springer-Verlag (1989);

J. S. Bridle, "Training Stochastic Model Recognition Algorithms as Networks Can Lead To Maximum Mutual Information Estimation of Parameters", in *Advances in Neural Information Processing* 2, David Touretzky, ed., Morgan Kaufman (1990);

O. Matan, J. Bromley, C. J. C. Burges, J. S. Denker, L. D. Jackel, Y. LeCun, E. P. D. Pednault, W. D. Satterfield, C. E. Stenard, and T. J. Thompson, "Reading Handwritten Digits: A ZIP code Recognition System", *IEEE Computer* 25 (7) 59–63 (July 1992);

C. J. C. Burges, O. Matan, Y. LeCun, J. S. Denker, L. D. Jackel, C. E. Stenard, C. R. Nohl, J. I. Ben, "Shortest Path Segmentation: A Method for Training a Neural Network to Recognize Character Strings", *IJCNN Conference Proceedings* 3, pp. 165–172 (June 1992);

C. J. Burges, O. Matan, J. Bromley, C. E. Stenard, "Rapid Segmentation and Classification of Handwritten Postal Delivery Addresses using Neural Network Technology", Interim Report, Task Order Number 104230-90-C-2456, USPS Reference Library, Washington D.C. (August 1991);

Edwin P. D. Pednault, "A Hidden Markov Model For Resolving Segmentation and Interpretation Ambiguities in Unconstrained Handwriting Recognition", Bell Labs Technical Memorandum 11352-090929-01TM, (1992); and Ofer Matan, Christopher J. C. Burges, Yann LeCun and John S. Denker, "Multi-Digit Recognition Using a Space Displacement Neural Network", in *Neural Information Processing Systems* 4, J. M. Moody S. J. Hanson and R. P. Lippman, eds., Morgan Kaufmann (1992).

While the prior art systems described in the above references can be distinguished from each other, they are best characterized by the structural and functional features which they share in common.

Specifically, each prior art system acquires at least one image I of a string of possibly connected characters that are to be interpreted by the system. In general, for a given alphabet, the number of possible interpretations from which the system must select the "best" interpretation is equal to the number of possible character strings that can be strung together using the characters in the alphabet and the applicable morphological constraints. In ZIP Code recognition applications, each permissible interpretation is constrained by the length of the ZIP Code, namely; it must have five or nine digits.

In accordance with convention, the acquired image of the character string is typically preprocessed to remove underlines, spatial noise, and the like. The preprocessed image I is then "cut" or divided into sub-images of manageable size. The sub-images between each set of adjacent cut-lines are referred to as image "cells". In some cases, the boundary between two cells is determined to be a "definite cut", definitely falling between two characters, while in other cases, the cut is considered indefinite and the determination of whether the cut falls between two characters is deferred until further processing is performed. Adjacent image cells are then combined to form image "segments". Thereafter, image segments are strung together, from left to right, in order to form acceptable image "consegmentations" which include substantially all of the pixels of the preprocessed image. Specifically, an acyclic directed graph is used to construct a model of the acceptable image "consegmentations". Typically, this model is constructed by associating each image segment with a node in a directed acyclic graph. The nodes in the graph are then connected with directed arcs. In general, two nodes in the graph are connected if and only if the image segments that they represent are legal neighbors in an acceptable image consegmentation.

When the graph is completely constructed, every path therethrough corresponds to an image consegmentation of the preprocessed image, and every possible image consegmentation corresponds to a particular path through the graph. After the graph has been constructed, recursive pruning techniques are used to remove from the graph any node which corresponds to an image segment that falls across a definite cut-line through the preprocessed image. After the graph has been pruned, each image segment associated with a node remaining in the pruned graph is sent to a neural network recognizer for classification and scoring. Based on such classification and scoring, each node in the pruned graph is assigned a "score" which is derived from the recognizer score assigned to the associated image segment. Typically, each recognizer score is converted into a probability by a computational procedure that involves normalizing the recognizer score. Thereafter a path score (i.e., joint probability) is computed for each path through the pruned graph by simply multiplying the "scores" assigned to the nodes along the path. According to this multiple character recognition (MCR) scheme, the highest-scoring path through the pruned graph corresponds to the "best" image consegmentation and characterstring interpretation for the acquired image. Details of such techniques are disclosed in application Ser. No. 07/816,414 filed Dec. 31, 1991, entitled "Alphanumeric Image Consegmentation Scheme," and application Ser. No. 07/816,415 filed Dec. 31, 1991, entitled "Graphical System For Automated Consegmentation and Recognition For Image Recognition Systems," both incorporated herein by reference.

While prior art methods have been useful in the design of commercial and experimental character recognition systems, the performance of such systems has been less than ideal, particularly in highly demanding, real-time applications. In particular, prior art MCR systems generally operate by identifying only one consegmentation that supports a given interpretation. This approach is premised on the notion that there is only one "best" consegmentation. In accordance with such prior art approaches, the score of this one "best" consegmentation is the only score that is considered during the recognition process. Consequently, prior art MCR systems employ methods that are tantamount to assuming, incorrectly, that the correct image consegmentation is known. Relying on this assumption, individual character scores are normalized in order to compute probabilities for particular characters in the permitted code or alphabet. This results in irretrievably discarding valuable information about how well the segmentation algorithm performed on the particular segment of the image. Prior art MCR systems based on such assumptions are often referred to as "maximum likelihood sequence estimation" (MLSE) machines.

In addition to choosing an interpretation of the image, some prior art MCR systems often provide a score that is meant to offer some indication of the probability that the chosen interpretation is correct. In many applications, it is desired to have a score that can be interpreted as an accurate probability, in order to facilitate combining that results of the MCR system with other sources of information. However, prior art MCR systems have tended to emphasize choosing the "best" interpretation, while de-emphasizing accurate scoring. Consequently, the scores often contain systematic errors of many orders of magnitude.

Thus there is a great need in the art for an improved method and system for interpreting sequences of symbols expressed represented in diverse medias.

OBJECTS OF THE PRESENT INVENTION

Accordingly, a general object of the present invention is to provide an improved method and system for interpreting input expressions, such as character strings expressed in or recorded on a medium using, for example, either printed or cursive (i.e., script) writing techniques.

A further object of the present invention is to provide such a method and system of automated character-string interpretation which uses a posteriori probabilities for the selection of the best character-string interpretation.

A further object of the present invention is to provide such a method and system of automated character-string interpretation, wherein each a posteriori probability is derived inductively, by combining a priori information with known example pixel images.

A further object of the present invention is to provide such a method and system of automated character-string interpretation which is capable of interpreting character-strings of arbitrary length, and can be readily adapted for in conjunction with automated sentence interpretation systems and the like.

A further object of the present invention is to provide a multiple character recognition system, in which a complex of optimally trained neural computing networks are employed during image consegmentation and character-string interpretation processes.

A further object of the present invention is to provide such a method of multiple character recognition, in which image consegmentation and character-string interpretation are combined into a single adaptive learning process which is carried out by a complex of neural computing networks optimally trained to maximize the score of the correct character-string interpretation.

A further object of the present invention is to provide such a system which uses a novel data structure based on a specially modified acyclic directed graph, in which each path therethrough represents both an image consegmentation and a character-string interpretation.

A further object of the present invention is to assign scores to selected possible interpretations of the image, in particular, scores which can be interpreted as accurate estimates of the probability of the selected interpretations.

A further object of the present invention is to provide such a system, in which the a posteriori probability assigned to each particular character-string interpretation is defined as a ratio, wherein the numerator of the ratio is computed by summing the path scores along all of the paths through the graph that represent the same character-string interpretation, and the denominator of the ratio is computed by summing the path scores along all of the paths through the graph that represent all of the possible character-string interpretations having the same number of characters.

An even further object of the present invention is to provide such a multi-character handwriting recognition system that can be realized as a portable device.

A further object of the present invention is to provide a method of character string interpretation, wherein the Viterbi Algorithm is used to identify which character-string interpretation has the best path score; wherein the Forward Algorithm is then used to compute the exact sum of all of the path scores that represent the character-string interpretation identified by the Viterbi Algorithm; and wherein the Forward Algorithm is used to compute a normalization constant for the exactly computed sum above, by summing all of the path scores through the graph that represent all of the possible character-string interpretations.

A further object of the present invention is to provide a method of character-string interpretation, wherein the Beam Search Algorithm is used to identify a number of competing character-string interpretations having the best set of path scores; wherein the Forward Algorithm is used to compute, for each character-string interpretation, the exact sum of all of the path scores that represent the competing character-string interpretation identified using the Viterbi Algorithm; and wherein the Forward Algorithm is then used to compute a single normalization constant for each of the competing character-string interpretations, by summing all of the path scores through the graph that represent all of the possible character-string interpretations.

A further object of the present invention is to provide an input expression interpretation system with a learning mode of operation, in which both the graph and the complex of neural informing processing networks are used to train the system by optimally adjusting the parameters of the neural networks during one or more training sessions.

An even further object of the present invention is to provide such a system, in which sensitivity analysis is used during neutral network training so that each adjustable parameter in the neural networks is adjusted in a direction that will increase the a posteriori probability of the known-to-be correct character-string interpretation and decrease the a posteriori probability of the known-to-be incorrect interpretations.

A further object of the present invention is to provide such an input expression interpretation system, wherein during its learning mode of operation, the Baum-Welch Algorithm is used to calculate how sensitively these scores produced by the overall system change in response to incremental changes made to each adjustable parameter of the neural networks.

These and other objects of the present invention will become apparent hereinafter and in the Claims to Invention.

SUMMARY OF THE PRESENT INVENTION

According to a first aspect of the present invention, a method and system are provided for forming an interpretation of an input expression expressed in a media, using either printed or cursive writing techniques.

In general, the system acquires an input data set representative of the input expression. The acquired input data set is divided into a set of segments, which are then used to specify a set of consegmentations. The system then uses a novel data structure to implicitly represent each consegmentation and each possible interpretation for the input expression. The data structure can be represented as a directed acylic graph comprising a two-dimensional array of nodes arranged in rows and columns and selectively connected by directed arcs. Each path extending through the nodes and along the directed arcs represents one consegmentation and one possible interpretation for the input expression. All of the consegmentations and all of the possible interpretations for the input expression are implicitly represented by the set of paths extending through the graph.

For each row of nodes in the graph, a set of scores is produced for the known symbol set using, for example, an optimally trained neural information processing network. In conjunction with the graph, these scores implicitly assign a path score for each path through the graph. Using these path scores, the system identifies the best symbol sequence interpretations, and computes a posteriori probabilities for them. By deriving each a posterjori probability by analyzing substantially the entire acquired input data set, a highly reliable probability is produced for each symbol sequence interpretation. The principles of the present invention can be practiced with virtually any expressed sequence of symbols, including cursively written character-strings of arbitrary length. The system can also be readily adapted for use in conjunction with automated sentence interpretation systems.

In a first illustrative embodiment of the present invention involving character-sequence recognition, the system determines the character-string interpretation having the highest scoring path through the graph. In order to determine whether this interpretation is reliable, the system also produces as output, the a posteriori probability for this character-string interpretation. This probability is computed as the ratio of a numerator portion to a denominator portion. The numerator portion is equal to the sum of the path scores for all paths through the graph representing a given character-string interpretation. The denominator portion is equal to the sum of the path scores for all paths through the graph representing all of the possible character-string interpretations. If the probability is less than a predetermined threshold, the user cannot guarantee that this interpretation is reliable, and thus the user is informed that other steps should be undertaken prior to further action.

In a second illustrative embodiment of the present invention, the system first finds a set of paths through the graph having the highest set of path scores. For each path in this set, the system identifies the corresponding character-string interpretation, and evaluates the a posteriori probability of that interpretation (including contributions from other paths with the same contribution). The system identifies the set of possible character-string interpretations which is represented by the found set of paths. The a posteriori probabilities for the set of possible character-string interpretations are then computed. The system analyzes the computed set of a posteriori probabilities in order to determine which possible character-string interpretation has the maximum a posteriori probability. Based on this analysis, the system produces as output, (i) one or more character-string interpretations having high a posteriori probabilities and (ii) an accurate estimate of the a posteriori probability for each character-string interpretation.

In the second illustrative embodiment, the a posteriori probability for each competing character-string interpretation is computed as the ratio of a numerator portion to a denominator portion. The numerator portion is equal to the sum of the path scores for all paths through the graph representing the competing character-string interpretation. The denominator portion is equal to the sum of the path scores for all paths through the graph representing all of the possible character-string interpretations.

According to a second aspect of the present invention, a novel way and means are provided for optimally training the symbol sequence interpretation system of the present invention. This is achieved by providing the system with a unique learning mode of operation.

In its learning mode of operation, the system processes a large number of training images representative of known input expressions. For each processed training image, the system incrementally adjusts the set of adjustable parameters that characterize the functioning of each neural network. The direction of each incremental adjustment is such that the average probability for the known-to-be correct character-string interpretation increases, while the average probability for the known-to-be incorrect symbol sequence interpretations decreases.

The system and method of the present invention can be used to interpret strings of characters which have been expressed in virtually any manner, including graphical recording on electrically-passive mediums such as paper, plastic or fabric, or on electrically-active mediums such as pressure-sensitive writing surfaces, and "touch-screen" writing and display surfaces, all well known in the art.

BRIEF DESCRIPTION OF THE DRAWINGS

For a more complete understanding of the Objects of the Present Invention, the following Detailed Description of the Illustrative Embodiment is to be read in conjunction with the accompanying drawings, wherein:

FIG. 1 is a system block diagram illustrating the various components used to realize the character-string interpretation system of the illustrative embodiments of the present invention;

FIG. 3 is a preprocessed image of a ZIP Code handwritten using a cursive writing technique;

FIGS. 4A to 4E are a set of preprocessed images of the ZIP Code in FIG. 3, each shown with a superimposed set of cut-lines generated during the image cell generation stage of the character-string interpretation method of the present invention;

FIGS. 13A and 13B, taken together, show a high level flow chart illustrating the steps performed during the method of training the character-string interpretation system of the present invention.

DETAILED DESCRIPTION OF THE ILLUSTRATIVE EMBODIMENT OF THE PRESENT INVENTION

As illustrated in FIG. 1, symbol sequence interpretation (i.e., "recognition") system 1 of the illustrative embodiment is shown to comprise a number of integrated system components. In particular, the system comprises one or more processing units 2 (e.g., microprocessors) controlled by programs stored in program memory storage 3. Program memory storage 3 also stores an operating system program, application programs, and various image processing routines of the present invention. Data storage memory 4 is provided for storing data associated with the data structure of the present invention.

Figure 2A:
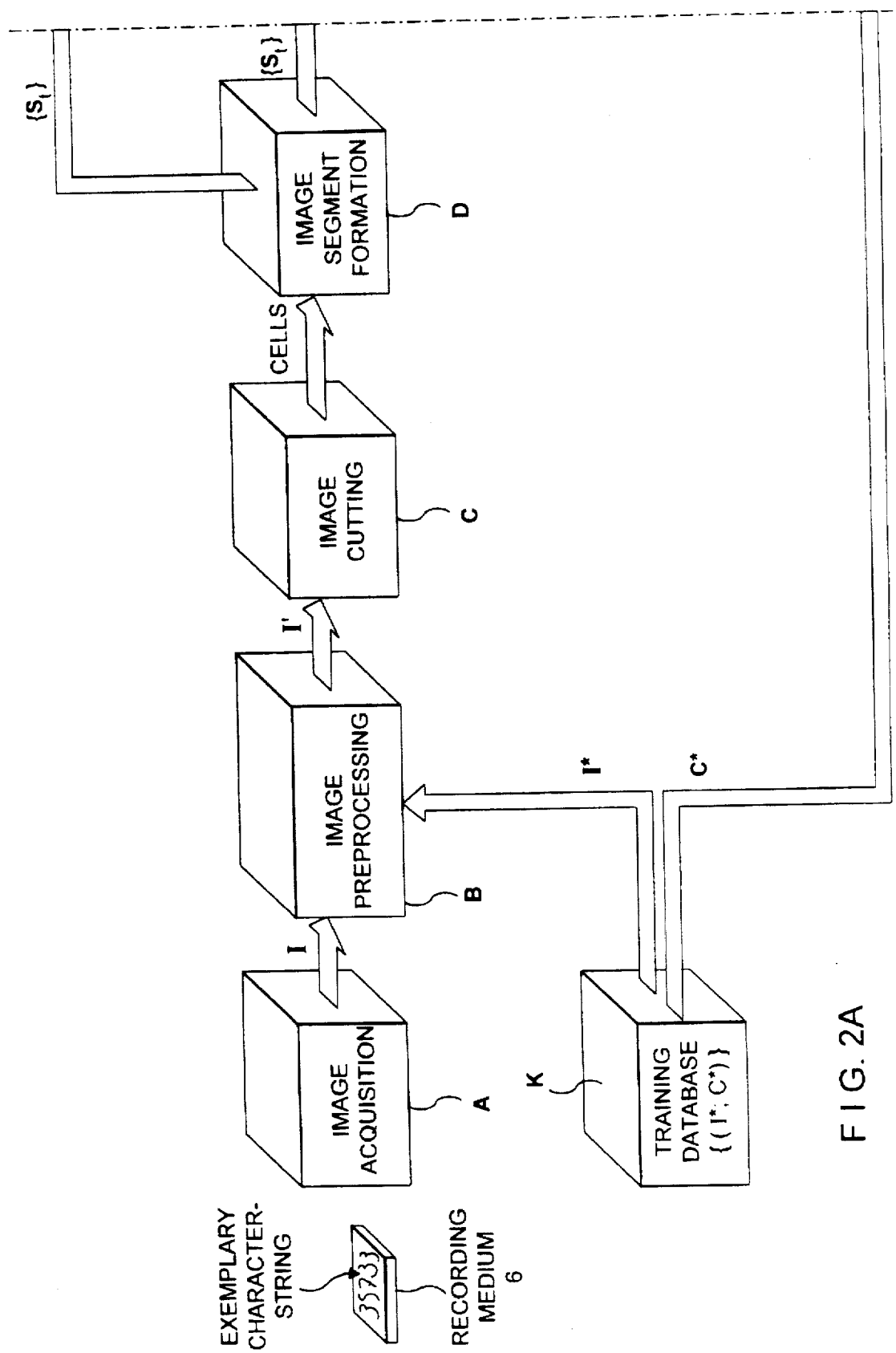
FIG. 2 is a block diagram of the character-string interpretation system of the present invention.
Figure 2B:
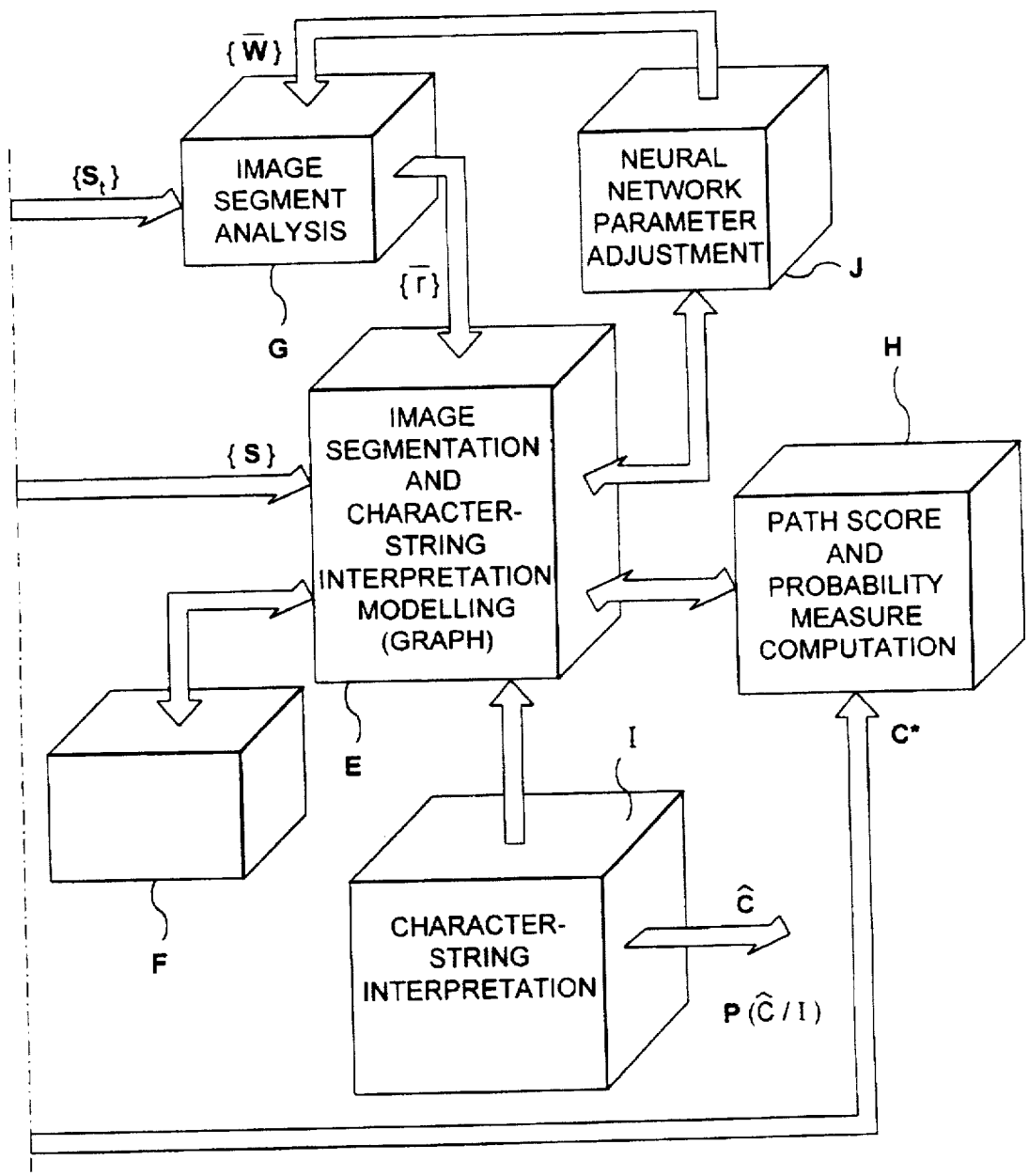

In general, the system includes an input data set acquisition device 5 for acquiring an input data set representative of an expressed sequence of symbols. In the illustrative embodiment, this device is realized as an image detector for acquiring gray-scaled or colored images of possibly connected strings of alphanumeric characters recorded on a recording medium 6, as shown in FIG. 2. In the illustrative embodiment, the character-strings can be recorded on electrically-passive recording surfaces such as paper, plastic, wood, fabric, etc. or on an electrically-active recording surface such as pressure-sensitive digitizing surfaces or "touch-screen" LCD writing and display surfaces well known in the art. The character-strings can be expressed using conventional printing or cursive (i.e., script) writing techniques.

As shown in FIG. 1, the system of the illustrative embodiment comprises random access data storage memory (e.g., VRAM) 7 for buffering acquired images of character strings to be interpreted. Mass data storage memory 8 is provided for long-term storage of these images. Preferably, the system also includes a visual display unit 9 having a visual display screen or surface (LCD); a keyboard or other data entry device 10; a device 11 for pointing to, dragging and selecting graphical icons visually displayed on the display screen; input/output device 12; and a system interface 13 for interfacing with one or more external host systems 14 that utilize information provided by system 1. Preferably, system components 2,3,4,7,and 8 are enclosed in a compact housing suitable for the particular application at hand. The other components may have their own housings. As shown, each of these components is operably associated with the processors 2 by way of one or more system buses 15 in a manner well known in the art. In ZIP Code recognition applications, the system of the present invention is suitably interfaced with conventional mailing sorting and routing machinery 14 well known in the postal art.

As illustrated in FIG. 2, character-string interpretation system 1 performs a number of functions in order to arrive at an interpretation of the graphically recorded "string of characters", denoted by Ci based upon the analysis of the pixel information contained in the acquired image I of a string of graphically recorded characters. These stages of image processing will be sequentially described in detail below, with reference to other identified figure drawings.

In general, the system and method of the present invention can be applied to machine-printed or handwritten character-strings of arbitrary length. Thus the present invention will be useful in handwriting recognition applications where a writer is permitted to write one or more words on a writing surface of one sort or another, or write one or more sentences for automated recognition. For clarity of exposition only, the first and second illustrative embodiments of the present invention shown at FIGS. 10A to 11B will consider the problem of interpreting (i.e., classifying) handwritten ZIP Codes, a case in which the character-string length is generally known to be five or nine digits. In alternative embodiments, however, the method and system of the present invention can be used to interpret character-strings (i.e., words) of arbitrary length, as in the greater context of automated sentence recognition systems known in the art.

In FIG. 2, Blocks A to I schematically represent the various stages carried out during the character-string interpretation process of the present invention. As indicated at Block A in FIG. 2, the first stage of the process involves capturing an image I of a character-string. Typically, each image I acquired by system 1 comprises a matrix of pixels. Each pixel in the image matrix has a gray-scale brightness representative of the intensity of the image at the pixel's location in the image. In addition, saturation of the pixels can be represented. Each acquired image is stored in frame buffer(s) 7. As indicated by Block B, the second stage of the process involves "preprocessing" the stored image I. Suitable image preprocessing operations performed by processor 2 typically include: locating the "region of interest"; removal of underlines; deslanting and deskewing the image; the removal of flyspecks (i.e., small connected components) and intruding strokes; and normalization of the image to a standard size (e.g., 20 pixels high, with a width chosen so that the aspect ratio of the image is unchanged). Notably, image normalization is done so that preprocessed image I' can be sent to subsequent stages of the system without requiring further image normalization. Often, the resampling performed during the normalization procedure results in an effectively gray-scale image even if the original image was black and white. The upper and lower contours of the normalized image are then used to clip long tails of characters in both horizontal and vertical image directions. Additional details regarding the above image preprocessing operations are disclosed in Applicants' copending application Ser. No. 07/816,414 entitled "Alphanumeric Image Segmentation Scheme" filed Dec. 31, 1991, supra.

The next stage of the recognition process, indicated at Block C, involves cutting the preprocessed image I' into sub-images, called "cells". The purpose of generating image cells is so that the image cells can be combined to form image "segments" $S_i$ during the image segment formation stage indicated at Block D.

In accordance with the present invention, image cells are generated by first performing "Connected Component Analysis" upon the preprocessed image to detect the presence of large "connected components". Thereafter a "smart" wiggly cut-line drawing process is applied to these sub-images containing the large connected components. Both the Connected Component Analysis and smart wiggly cut-line drawing subprocesses are carried out by programmed processors 2 using associated RAM 4. More specifically, Connected Components Analysis analyzes the intensity of the pixels comprising the preprocessed image in order to determine the presence of character components (i.e., pixel groups) which are connected together. Notably, Connected Component Analysis searches along both the vertical and horizontal image directions for pixel clusters having a predetermined range of intensity value and which appear to form large character components that are connected together, and which might likely be associated with one or more characters. Examples of connected character components are indicated in the second and third ZIP Code images presented in FIGS. 4A to 4F.

It is possible that more than one character is contained within the sub-image containing a large connected component. It is important to determine where a cut-line is to be drawn through such a sub-image in order that no more than one character is represented by the pixels of an image cell. This is achieved by generating "wiggly" cut-lines through identified large connected components. In general, this cut-line generating process is permitted to subdivide a character represented by a large connected component, into two or more image cells by simply drawing cut-lines through the pixel group representing the character. The number of ways in which adjacent image cells can be combined to construct an image segment grows rapidly with the number of image cells generated during this stage of the recognition process.

Figure 4D:
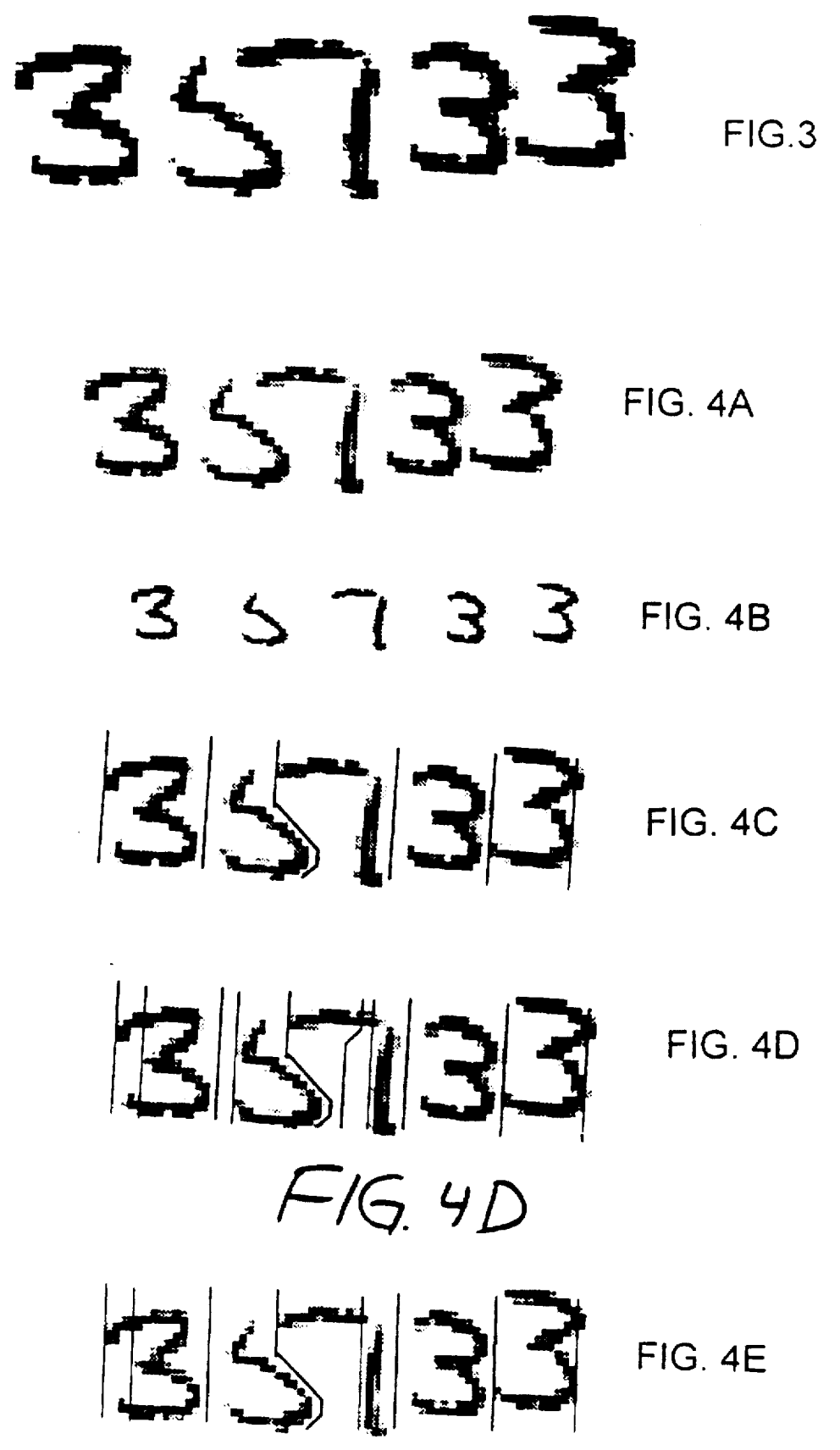
Figure 5:
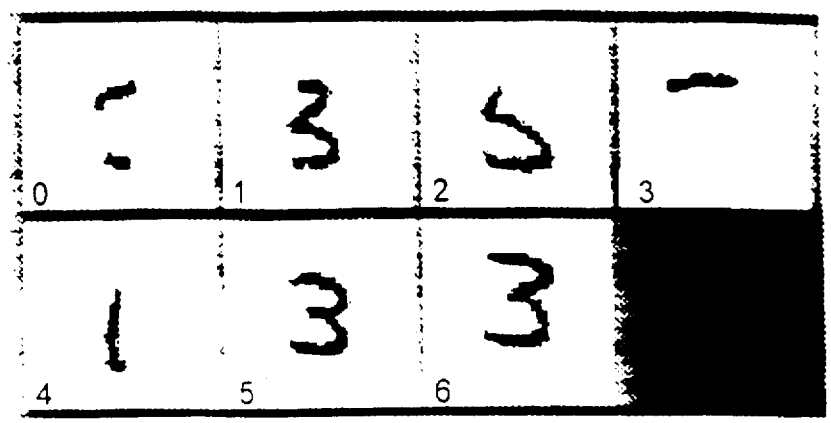
FIG. 5 is a table of image "cells" (i.e., sub-images) formed between the cut-lines shown in FIG. 4.

The system of the present invention avoids cutting the preprocessed image into ultra-small image cells by employing complex heuristics which identify a set of good cut-lines, remove redundant lines and the like. The operation of this subprocess is illustrated by the cut-lines drawn on and selectively removed from the preprocessed image shown in FIGS. 4A to 4E. At the end of this subprocess, the pixels between each adjacent pair of remaining cut-lines define an image "cell". The image cells produced during the exemplary image cell generation process are tabulated in FIG. 5. As shown in this table, each image cell is identified by a cell number, e.g., 0,1,2,3,4, etc. Additional details regarding the automated generation of cut-lines during this stage of the recognition process hereof are disclosed in copending application Ser. No. 07/816,414, supra.

Figure 6:
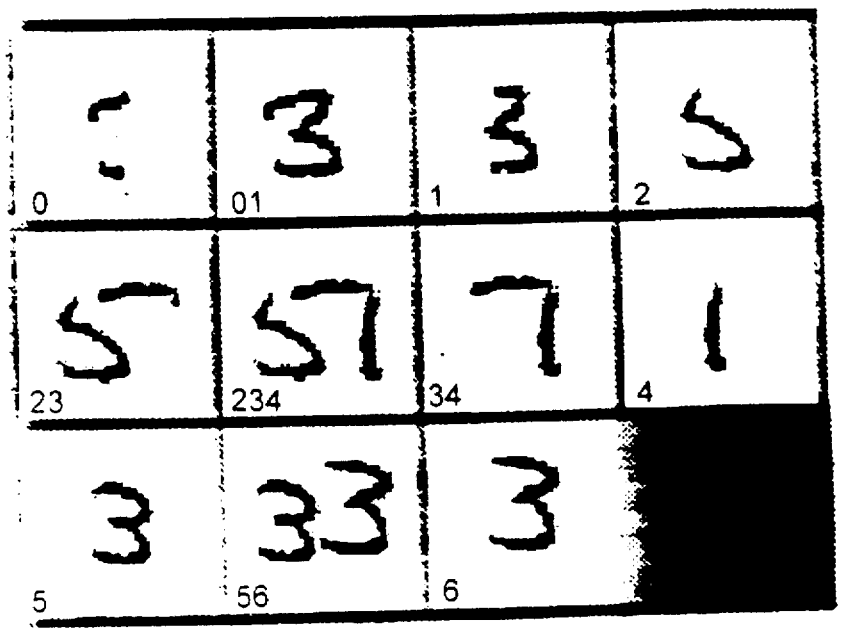
FIG. 6 is a table of image "segments" formed by combining adjacent image cells shown in FIGS. 4 and 5.

As indicated at Block D in FIG. 2, the subsequent stage of the process involves combining contiguous (i.e., consecutive) image cells, in a left-to-right order, to produce a set of image "segments", as shown in the table of FIG. 6. As shown in this table, each image segment is identified by combining the numbers assigned to its constituent image cells, e.g., 0, 01, 1, 2, 23, etc. Ideally, each image segment contains pixels representing one and only one character. However, this will not always be the case. It is important that the final set of image segments contains correct image segments. Complex heuristics are used to determine how many image cells and which image cells should be combined to construct image segments. In general, heuristics are expressed in terms of "definite" cuts "interconnected component" cuts, "intraconnected component" cuts, etc. The parameters and adjustment factors of these heuristics are determined empirically. Each image segment consists of a set of image pixels which will be analyzed by the assigned neural information processing network invoked by the system. As will be explained in greater detail hereinafter, the function of each neural network is to analyze the set of pixels of each image segment to which it has been assigned and to produce as output, a score for each of the (10) possible numeric characters (i.e., symbols) that the pixel set might actually represent or be classified as possibly being.

Figure 7:
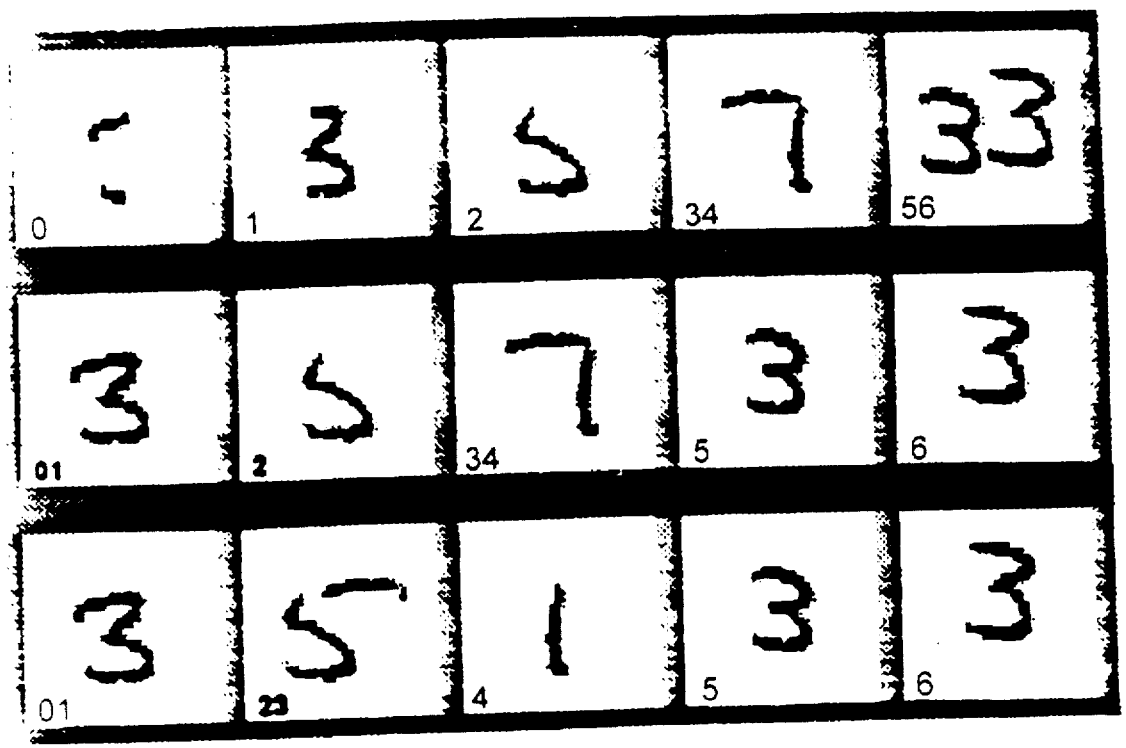
FIG. 7 is a table setting forth three of the many legal image "consegmentations" formed by connected sets of spatially contiguous image segments shown in FIG. 6.

The next stage of the process generally represented at Block E, involves stringing together, from left-to-right, consecutive image "segments" in order to produce a set of acceptable (i.e., legal) image "consegmentations". Each such image consegmentation should account for all of the pixels in the preprocessed image I'. Preferably, it is desired to consider as few consegmentations of the image as possible, yet insuring that the correct consegmentation is contained in the set of all image consegmentations constructed from the generated image cells. In the table of FIG. 7, three of the many legal image consegmentations for the exemplary five character ZIP Code are shown. As indicated at Block E, the consegmentations are formed implicitly by the "direct acyclic alignment graph" of FIG. 8. The structure of the graph ensures that each of these image consegmentations consists of five image segments. In order to capture the reality of the spatial structure of the input image I, there are rules which govern the manner in which image segments can be strung together. For example, the right edge of one segment must abut the left edge of the succeeding image segment (i.e., it is not permissible to skip a bunch of pixels and/or combine pixels in the wrong spatial order). However, if desired, some of these restrictions can be relaxed under appropriate conditions. Additional details regarding the stringing together of consecutive image segments $S_i$ are disclosed in copending application Ser. No 07/816,415 entitled "Graphical System for Automated Segmentation and Recognition For Image Recognition Systems," supra. If desired, selected image consegmentations can be exhibited explicitly at Block F.

Notably, the direct acyclic graph of the present invention also provides a novel means of simultaneously modeling (i.e., representing) both the set of possible image consegmentations {S} of the preprocessed image I' and the set of character-string interpretations (i.e., classification) {C} that are permitted by the character alphabet and possibly constrained by the syntax of the language or code in which the recorded character-string has been expressed. As will be described in detail with reference to FIG. 8, this data structure, graphically expressible as a "direct acyclic graph", is used by the system of the present invention in order to formulate, in a unified fashion, both the image consegmentation and character-string interpretation problems as a "best path through the graph" problem. Intuitively, this problem formulation has geometrical appeal. The alignment graph, the data structure which implements it, and the processes which utilize it, will be described in detail below. Thereafter the processes which utilize this graph will be described in great detail during the Image Segment Analysis Stage indicated at Block G in FIG. 2, the Path Score and Probability Computation Stage indicated at Block H, and the Character-String Interpretation Stage indicated at Block I thereof.

Figure 8:
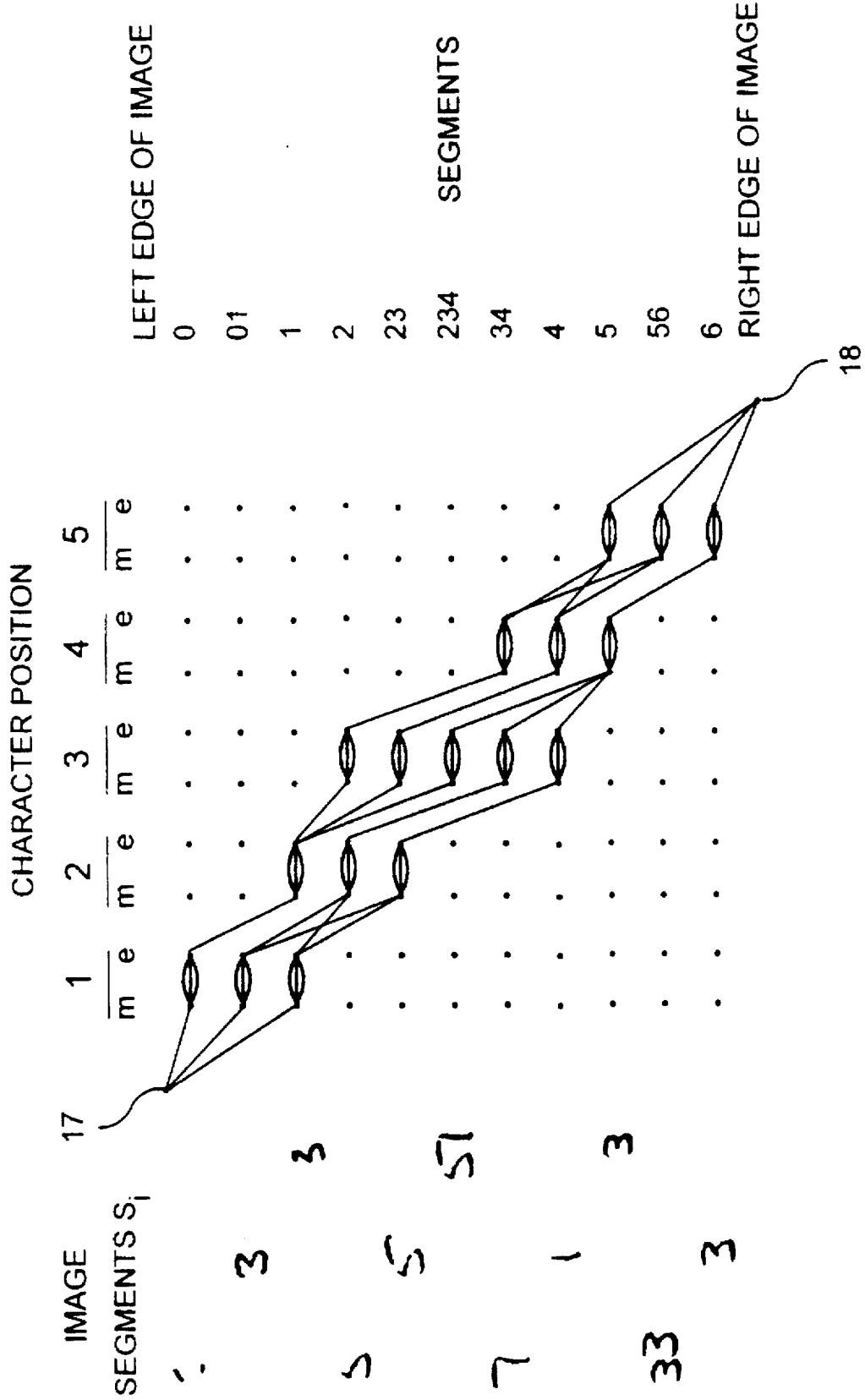
FIG. 8 is a graphical representation of the novel data structure of the present invention which is used to graphically represent the image segments, the possible image consegmentations formed therefrom, the possible character-string interpretations, and the scores assigned to the possible character-string interpretations.

As shown in FIG. 8, the graph of the present invention comprises a two-dimensional array of nodes which, at a high level of description, is similar to prior art graphs referred to as lattice or trellis diagrams. As will become apparent hereinafter, the alignment graph of the present invention is implemented by a data structure which performs a number of important modeling functions. In a manner well known in the programming art, this data structure is created, modified and managed by programmed processors 2. Each node in the alignment graph is realized as a separate data structure, which is a substructure of the "main data structure". The data structure for each node has a number of "local" information fields specifically labeled and adapted for storing the following informational items: a unique node identifier (i.e., code identifying the column/row address of the node); the computed scores for each of the possible numeric characters that the pixels of the associated image segment may represent; the computed "unnormalized" scores for each of the possible numeric characters that the pixels of the associated image segment may represent; the node identifiers of its ancestor nodes; and the node identifiers of its descendent nodes.

In order to store the information produced during each instance of the process, the main data structure has a number of "global" information fields specifically labeled and adapted for storing the following informational items including: a set of codes identifying which particular image segment is represented by the nodes of each particular row in the alignment graph; a set of addresses identifying where each image segment is stored in memory; and the sum of scores along selected paths and groups of paths through the alignment graph that represent the same character-string interpretation.

In the first illustrative embodiment, the number of columns in the alignment graph is equal to the number of characters in the possible character-string interpretations (e.g., 5 for the ZIP code of FIG. 3). Also, the number of rows in the alignment graph is equal to the number of image segments constructed during the image segment generation stage of the process. Thus, the size of the alignment graph will typically vary in row-size for each image I that has been acquired for interpretation (i.e., analysis and classification). Consequently, for each acquired image I, programmed processor 2 routinely generates a graph of the type shown in FIG. 8 which is particularly tailored to the acquired image. Each such alignment graph is physically implemented by creating a data structure corresponding thereto which is stored in RAM 4. Information relating to the image consegmentations for image I and its possible character-string interpretations are stored in the information fields of the data structures particularly created for this image. Ultimately, this organized information is used by the programmed processor 2 to select the most probable character-string interpretation C from the candidate set thereof {C}.

As illustrated in FIG. 8, the alignment graph of the present invention has a number of fine structural features. The main part of the graph contains rows and columns. Each column corresponds to one character position in the character-string interpretation C. Because the example deals with a 5-character ZIP code, 5 columns are required as shown. Each row corresponds to an image segment. Because the example contains 11 segments, 11 rows are required, as shown. At each intersection of a row with a column, there is a node, represented by a pair of dots (••). The left dot represents the "morning" part of the node and the right dot represents the "evening" part of the node. Each such node can be specified by its row index and its column index. In addition, there is a special start node 17 located before the first character position and to the left of the left-most image segment. There is also a special end node 18 located to the right of the last character position and below the rightmost image segment.

As illustrated in FIG. 8, there are ten recognition arcs connecting the morning and evening portions of each node. For clarity, only three of the ten recognition arcs are visible in FIG. 8. During the interpretation process, each recognition arc 19 is labeled with an "r-score" that is assigned to the character represented by the recognition-arc. In the exemplary embodiment, these recognition arcs represent unnormalized r-scores assigned to the numeric characters comprising ZIP Codes. However, in word and sentence recognition applications, these recognition arcs will typically represent the unnormalized scores assigned to symbols in a predetermined alphabet or vocabulary. As shown in FIG. 8, a directed glue-arc 19 is also drawn between each evening portion of one node and the morning portion of its immediate neighboring node in order to represent node descendency and ancestry among such nodes. Unlike recognition arcs, the glue arcs in this example are not assigned r-scores by a neural network. In other embodiments, complex glue-arc scores may be used, but for this embodiment a simple system is used: allowed arcs are assigned score 1.0 and retained, while disallowed arcs are assigned score 0.0 and discarded from the alignment graph.

As shown, the morning portion of any node may have more than one glue-arc entering it. Similarly, the evening portion of any node may have more than one glue-arc leaving it. As a result of the constraints imposed upon the construction of image consegmentations, there may be glue-arcs in the alignment graph that make sense locally, but do not make sense globally. Consequently, certain glue-arcs can be removed or pruned in order to improve the computational efficiency of the interpretation process. The following "glue-arc" pruning procedure can be performed upon the alignment graph prior to advancing to the Image Segment Analysis Stage indicated at Block G in FIG. 2.

The first step of the glue-arc pruning procedure involves computing the "forward cone" of nodes that are descendants of the start-node by iteratively marking the descendants of nodes that are already marked as members of the forward cone. The second step of the procedure involves computing the "backward" cone of nodes that are the ancestors of the end-node by iteratively marking the descendant of nodes that are already marked as members of the backward cone. The third step of the procedure involves determining which nodes are not in the logical intersection of these two cones, and to then mark these cones as "dead". Thereafter, any glue-arcs extending to or from a node marked "dead" are deleted (i.e., pruned) from the list of allowed glue-arcs. Each node within the intersection of these cones is deemed "alive" and will have scores assigned to its set of recognition-arcs during the image segment analysis stage. Notably, by satisfying this global constraint, there typically will be many nodes in the upper-right and lower-left hand corners of the alignment graph that do not have legal ancestors or descendants. This fact is represented by the absence of incoming and outgoing glue-arcs in these regions of the alignment graph, as illustrated in FIG. 8. In addition, if necessary or desired, the alignment graph may be pruned using the presence of definite cuts.

Each path through the graph represents both a consegmentation and an interpretation. The glue arcs in the path specify the consegmentation, while the recognition arcs in the path specify the interpretation. In order to understand how the process of the present invention selects the "correct" character-string interpretation from either the entire set of possible character-string interpretations, or from a much smaller set of competing character-string interpretations, it is first necessary to understand several subprocesses which precede the ultimate selection of the "correct" character-string interpretation. The first subprocess relates to the computation of unnormalized r-scores assigned to the recognition arcs at each node. The second subprocess relates to the computation of the sum of r-scores associated with all of the character-string paths through the alignment graph that represent the same character-string interpretation. These subprocesses will be described below.

Figure 9:
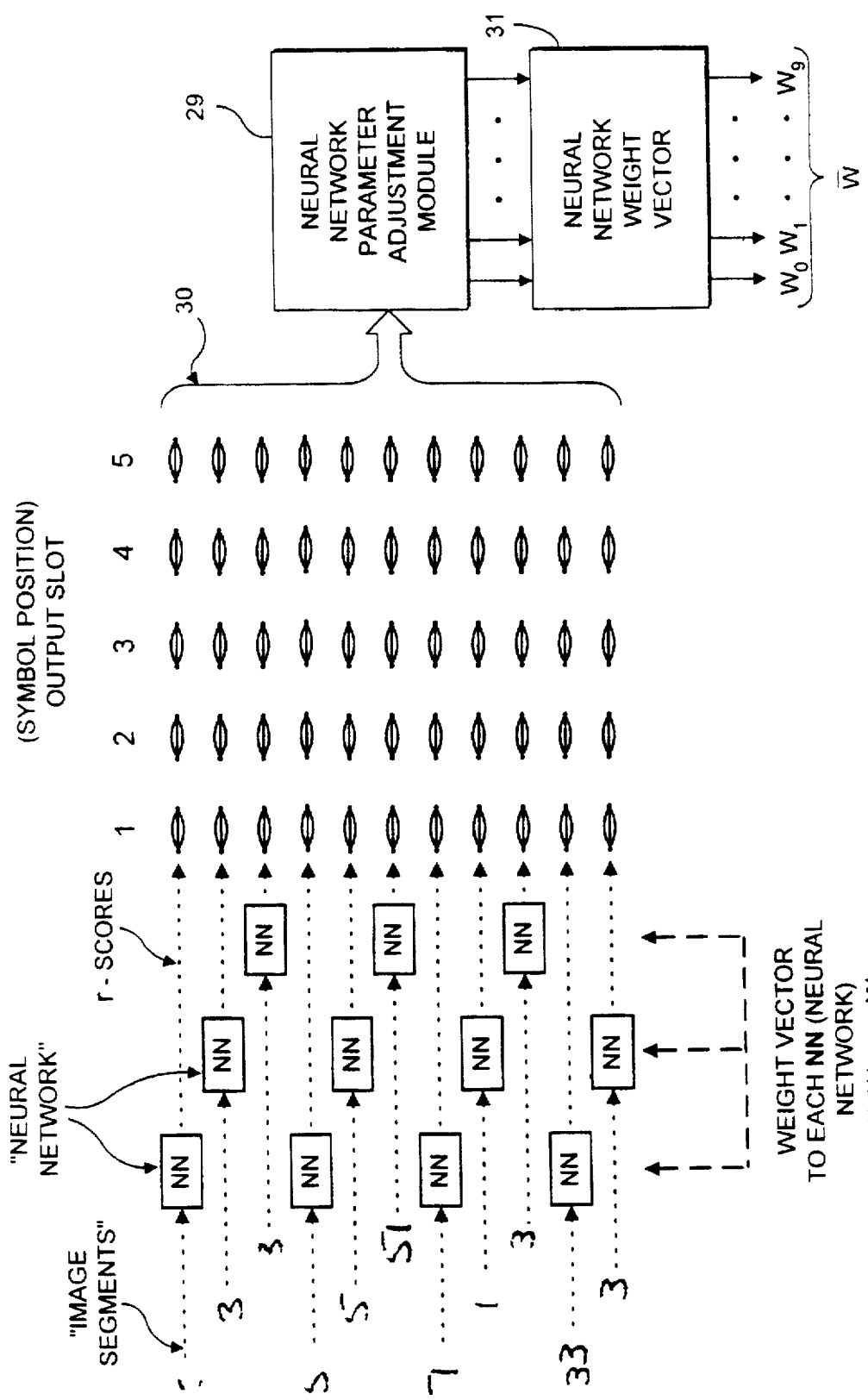
FIG. 9 is a schematic representation of the character-string interpretation system of the present invention shown adaptively configured for recognizing a zip code image that has been analyzed into eleven image segments.

As illustrated in FIG. 9, the image segment analysis stage of the interpretation process makes use of a complex of neural computing networks 21. The primary function of each i-th neural computing network is to analyze the pixels of image segment $S_i$ coindexed with the i-th row in the graph, and to compute a set of "scores" (i.e., r-scores) which are assigned to recognition-arcs at each node in the i-th row in the graph.

There is one segment and hence one neural network per row, and all nodes in the same row receive the same set of ten r-scores. For clarity, only three of the ten recognition arcs are shown in FIG. 9 for each node. In essence, each neural computing network maps its input (a group of pixels represented by a set of numbers) to a set of ten number $r_0 \, r_1 \ldots r_9$ called r-scores. The architecture of the network guarantees that these r-scores are positive, permitting their interpretation as unnormalized probabilities. A large value for $r_0$ represents a high probability that the input segment represents the digit "0", and similarly the other nine r-scores correspond to the other nine digits, respectively. A large r-score also reflects a high probability that the input segment is part of a correct consegmentation of the image; conversely, if a segment were formed by cutting a digit in half (as sometimes may occur) all ten r-scores for that segment should be small to represent detection of the undesirable nature of the segment.

In accordance with convention, the mapping function of each neural computing network is characterized by a set of adjustable parameters representable in vector form as a Weight Vector W with components, $w_1, w_2, \ldots w_m$. Initially, the set of adjustable parameters of each neural computing network is adjusted to a set of initial values. However, as will be described in greater detail hereinafter, a Neural Network Parameter Adjustment Stage indicated at Block J in FIG. 2, is provided so that during one or more learning sessions, these parameters can be incrementally adjusted in such a way that the input/output mapping function of each neural computing network is conditioned to conform to a reliable set of training data. In the preferred embodiment of the present invention, this training data set consists of several hundred thousands of validated training images taken of ZIP Codes that have been handwritten by different people across the country.

In the exemplary embodiment, the r-scores produced from each i-th neural computing network are expressed in vector form as $r=r_1, r_2 \ldots, r_N$, and assigned to the ten corresponding recognition-arcs (i.e., information fields) at all of the nodes in the i-th row of the alignment graph. In general, each neural computing network can be realized as a computer program, an electronic circuit, or any microscopic or macroscopic device capable of implementing the input/output mapping function of a neural computing network. In the preferred embodiment, however, each neural computing network is implemented by executing the well known LeNet™ computer program, described in great detail in the technical article entitled "Handwritten Digit Recognition with a Back-Propagation Network", by Y. Le Cun, et al., published at pages 396–404 in *Advances in Neural Information Processing* 2, (David Touretzky, Editor), Morgan Kaufman (1990). Further discussion regarding the construction and training of neural computing networks can be found the article "Automatic Learning, Rule Extraction, and Generalization" by John Denker, et al.,published at pages 877–922 in *Complex Systems*, Vol.1, October, 1987.

In the alignment graph, there may be two or more paths (representing different consegmentations) that represent the same character string interpretation. According to the principles of the present invention, the paths that represent a given interpretation should be considered as a "group". The score assigned to the given interpretation should depend on the sum of the scores of all paths in the group. This is in contrast with prior art recognizers, which generally consider the score for only one path in this group, disregarding the contributions of other paths in the group.

In the case of images containing five digits, there will generally be $10^5$ possible distinct interpretations, and the number of paths through the alignment graph may well be even larger. It is therefore impractical to exhibit them explicitly, or to consider each possibility individually. The data structure and the algorithms of the present invention permit the system to identify certain important groups of paths, such as the group of paths corresponding to a given interpretation, or the group of all paths, and to evaluate efficiently the score of the group, i.e., the sum of the scores of the paths in the group.

The system of the present invention analyzes the pixels of the acquired image I, and computes the sum over all paths through the graph that represent the candidate interpretation (i.e., classification) for which the probability is being computed. Each term in the sum is the product of the scores assigned to the arcs that comprise a certain path in the alignment graph. Normalization is performed only after the sum is computed. We call this "string by string" normalization. In contrast, prior art recognizers that compute probabilities generally normalize scores relatively early in the process, typically in a manner than is tantamount to normalization "character by character", thereby discarding valuable information about the quality of the consegmentation. It is important that the neural computing network training process described below train the complex of neural networks to produce r-scores that contain information about the probability that a given consegmentation is correct, and not just the probability that a given character-interpretation of the segment is correct.

The normalized score produced by the system and method of the present invention represents an estimate of the a posteriori probability P(C|I). In contrast, maximum likelihood sequence estimation probabilities used in prior art multiple character recognition MCR systems generally use a priori probabilities (i.e., likelihoods) of the form P(I|C). This is acceptable for many purposes, since these different probability measures can be related to each other given some additional information. The real advantage of the a posteriori formulation is that the internal calculations of the system and method of the present invention depend on estimates of the a posteriori joint probability of interpretation and consegmentation, P(C,S|I). The corresponding a priori (likelihood) expression P(I|C,S) cannot readily be related to the useful a posteriori form, since it is not generally feasible to estimate the marginal probability P(S). As a result, prior art recognizers, while they are able to identify the highest-scoring interpretations, are typically unable to assign scores which are properly normalized. The well-normalized scores of the present invention can be more readily interpreted as probabilities and therefore can be more easily combined with information from other sources.

In general, the goal of the procedure set forth in FIG. 10 is to compute a novel a posteriori probability P(C|I) for each competing character-string interpretation represented by the alignment graph illustrated in FIG. 9. Notably, each such probability is computed as a ratio expressed as a numerator portion divided by a denominator portion. Mathematically, the probability measure of the present invention is expressed as:

$$P(C,I) = \frac{N(C|I)}{D(I)} = \frac{\sum_{S'} \prod_i r(C_i, S'_i, I)}{\sum_C \sum_{S''} \prod_i r(C_i, S''_i, I)}$$

Notably, the first term $$\prod_i r(C_i, S'_i, I)$$

in the numerator portion represents a series of multiplications of the r-scores along the arcs of each path ($S_i$), and the entire numerator portion $$\sum_{S''} \prod_i r(C_i, S_i, I)$$

represents a summation of such path score products over all of the paths (i.e., consegmentations S') that represent the same character-string interpretation. The first expression $$\sum_{S''} \prod_i r(C_i, S''_i, I)$$

in the denominator portion represents the sum of path score products over all of the paths that represent the same character-string interpretation, and the entire denominator portion $$\sum_C \sum_{S''} \prod_i r(C_i, S''_i, I)$$

represents a summation of all of the path score products over all of the character-string interpretations {C} represented by the alignment graph.

Since the denominator portion includes contributions from all possible interpretations, its value depends only on the acquired image I, not on the particular interpretation C. The purpose of the denominator portion is to ensure that the probability is properly normalized, such that the sum (over all $C_i$) of P($C_i$|I) equals unity (i.e., 1), in accordance with general principles of probability.

Once the numerator portion is computed for a particular character-string interpretation, then the probability for this character-string interpretation is obtained simply by dividing its computed numerator by the common denominator. Fortunately, there are a number of different ways in which the above-described probability computing procedure may be used, such as by incorporation into a grander procedure, in order to arrive at a "correct" character-string interpretation. One approach is illustrated in the flow chart of FIGS. 10A and 10B, whereas an alternative approach is illustrated in the flow chart of FIGS. 11A and 11B. These two alternative approaches will be described in detail below.

Figure 10A:
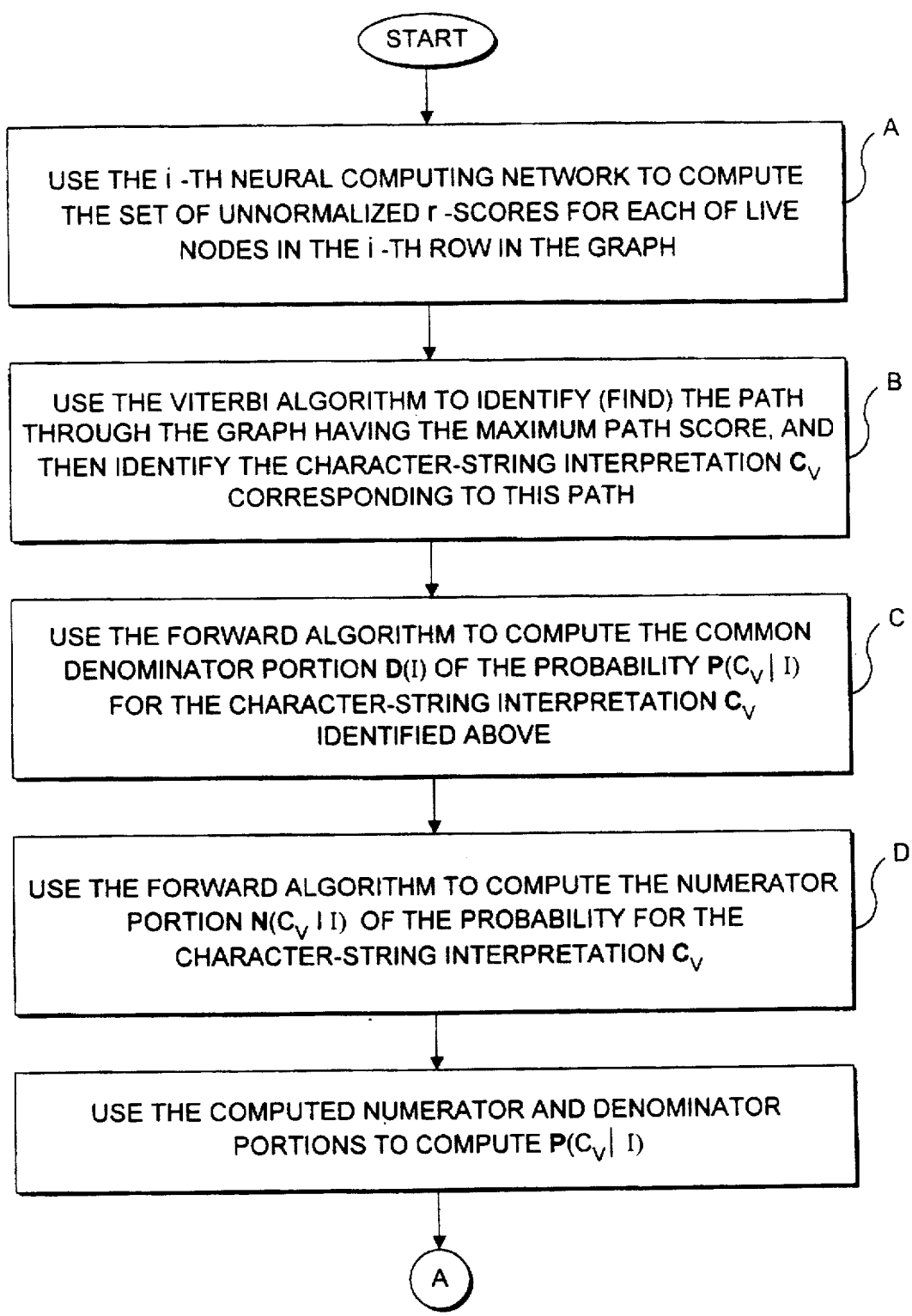
FIGS. 10A and 10B, taken together, show a high level flow chart illustrating the steps performed during the method of interpreting character-strings in accordance with the first illustrative embodiment of the present invention.
Figure 10B:
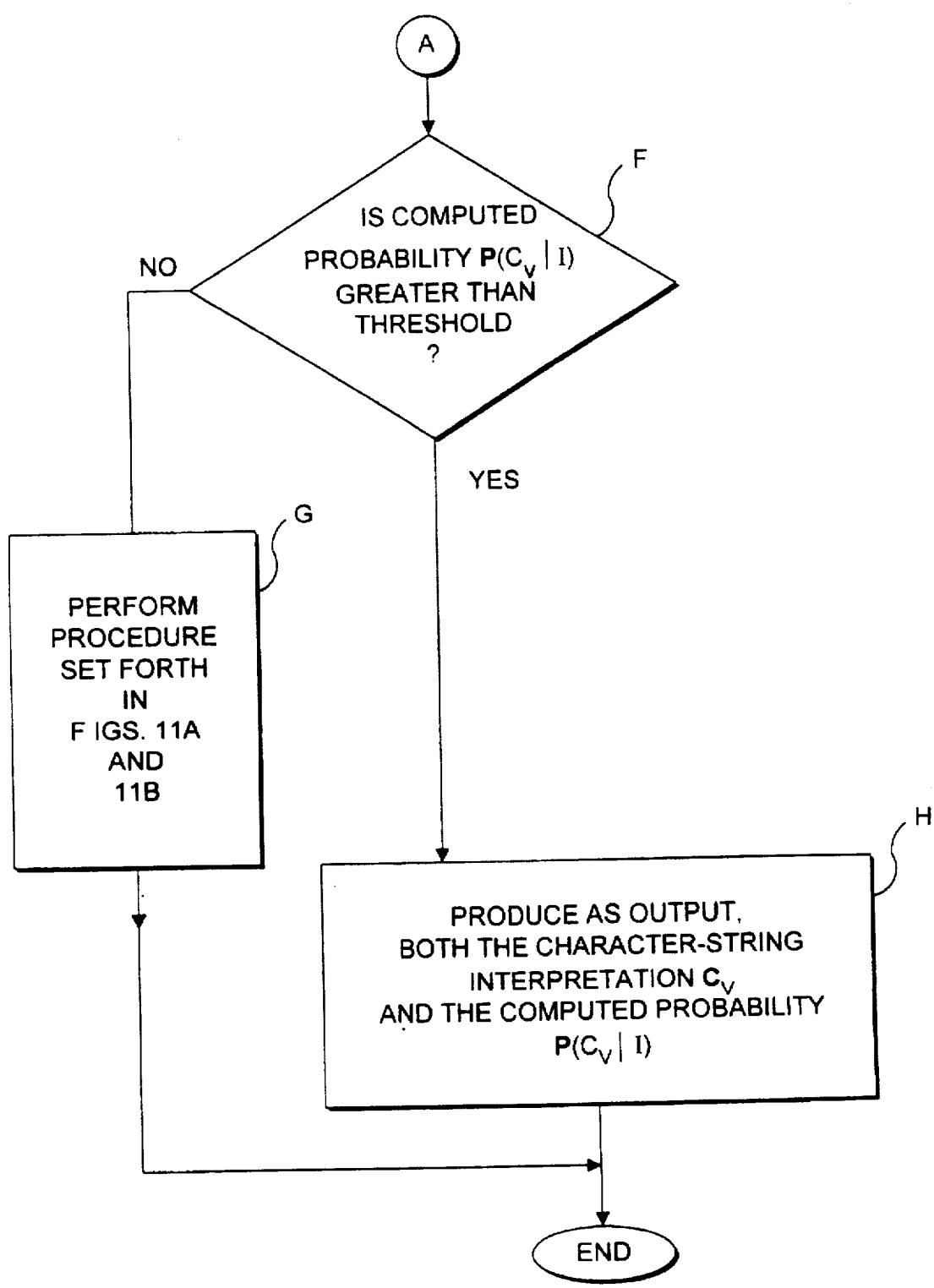

The steps of the first character-string interpretation procedure of the present invention are set forth in the flow chart of FIGS. 10A and 10B. As indicated at Block A, the first step of this procedure involves using an i-th neural computing network shown in FIG. 9 in order to compute the set of r-scores for each of the nodes along the i-th row in the graph. Then as indicated in Block B, the procedure uses the well known Viterbi Algorithm in order to identify (as a sequence of codes representing glue arcs and recognition arcs) the path through the alignment graph having the maximum path score. Then the processor identifies the character-string interpretation corresponding to this path. As the path score for this character-string path is merely an approximation which, by itself, is not a reliable measure, it is therefore discarded. Only information identifying the character-string interpretation $C_{(v)}$ represented by this path (e.g., 35733 for five character ZIP Codes) is retained.

Then as indicated at Block C in FIG. 10A, the procedure uses the well known "Forward Algorithm" to compute the common denominator portion D(I) of the probability measure for the identified character-string interpretation. This number is then stored in a main data structure used to implement the alignment graph of FIG. 8. Use of the Forward Algorithm provides a precise value for the sum (all over paths) of the product (along each path) of the unnormalized r-scores for all possible character-string interpretations represented by the alignment graph. In some embodiments, the glue arcs contribute to the path scores only by virtue of their presence or absence. In more complex embodiments, scores can be assigned to the glue arcs (as well as to the recognition arcs) and all such scores are included as factors in the product along each path.

As indicated at Block D in FIG. 10A, after computing the common denominator portion D(I) above, the procedure uses the "Forward Algorithm" to compute the numerator portion N($C_{(v)}$I) of the probability measure for correct the character-string interpretation C($_v$) previously identified by the Viterbi Algorithm. This number is then stored in the main data structure used to implement the alignment graph of FIG. 8. Here, the Forward Algorithm accepts as input the code which identifies the selected character-string interpretation identified by the Viterbi Algorithm, and produces as output a precise numerator value (i.e., a restricted sum) for this selected character-string interpretation C($_v$). Notably, the computed numerator portion for the character-string interpretation is equal to sum (over paths) of the product of unnormalized r-scores along each path through the alignment graph that represent the character-string interpretation C($_v$). During this computation of the numerator portion, glue arcs are treated the same way as during computation of the denominator.

As indicated at Block E in FIG. 10A, after the denominator portion and numerator portions have been computed, the improved probability P($C_v$|I) is computed for the character-string interpretation C($_v$). This probability is then stored in the main data structure. Finally, as indicated at Block F in FIG. 10B, the processor determines whether the computed probability at Block E is greater than a threshold. If it is, then the processor is assured that the character-string interpretation selected by the Viterbi Algorithm is the highest-probability character-string interpretation for the analyzed image I. Thereafter at Block G, the processor produces as output from the system, both (i) the character string interpretation (e.g., 35733) and (ii) the computed probability associated therewith. Together, these two items can be use (in conjunction with other information) as the basis for decision on how to route the piece of mail.

At this stage in the processing, there may be one or more reasons why it may be advantageous to perform additional computations in order to identify additional high-scoring interpretations. For one, it may be desired to ensure that the highest-probability interpretation has been identified even if at Block F the probability assigned to C(,) is less than 0.5. In this case a set of competing character-string interpretations is identified, and the probability is computed for each member of the set. Also, the present invention may be used as part of a larger system wherein multiple interpretations (and, the probabilities) thereof are used in subsequent processing. Specifically, an interpretation which is given a high, probability by the present invention on the basis of the acquired pixel image may be ruled out by later stages in the larger system, whereupon an alternative interpretation would be needed.

Figure 11A:
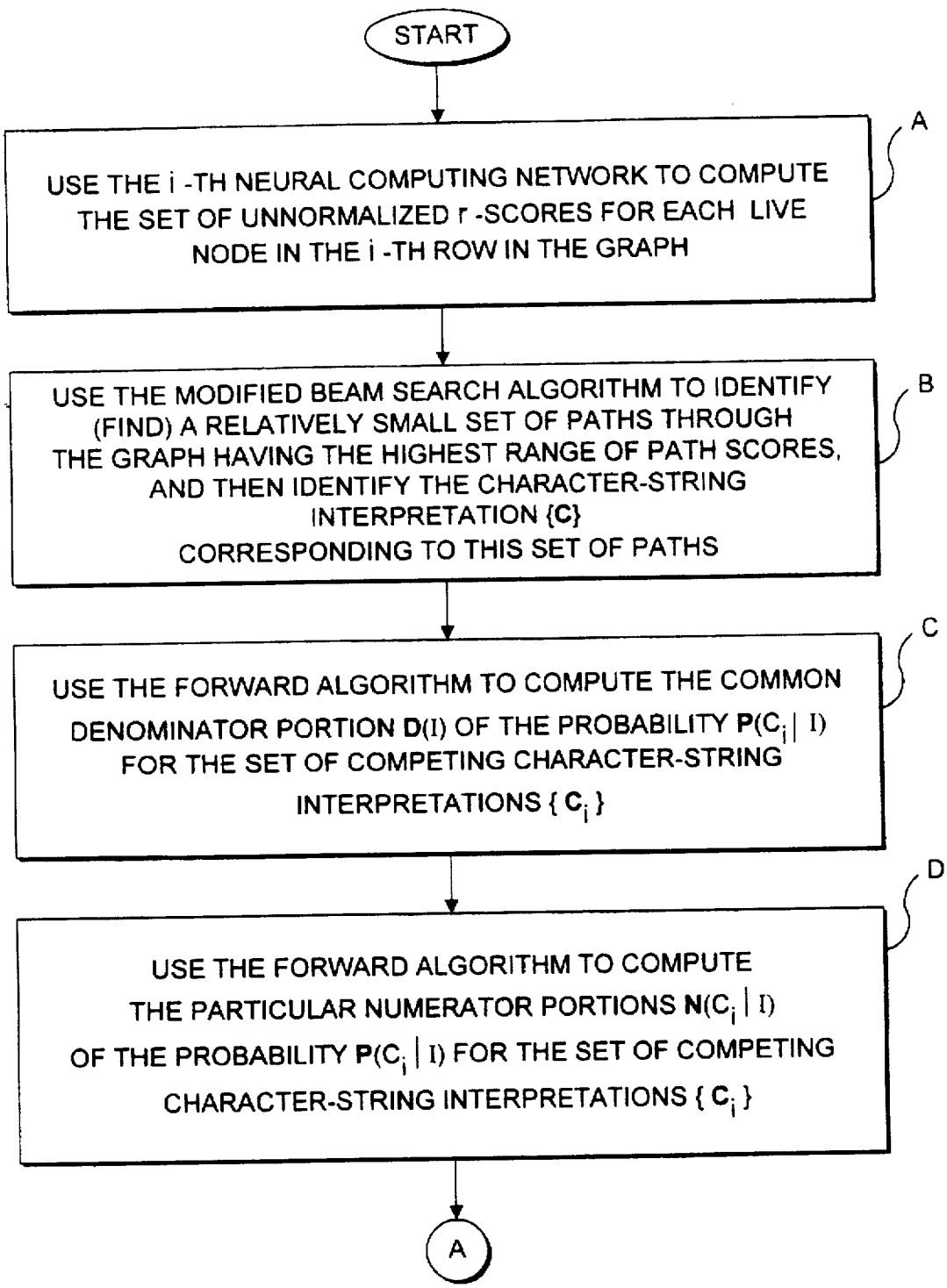
FIGS. 11A and 11B, taken together, show a high level flow chart illustrating the steps performed during the method of interpreting character-strings in accordance with the second illustrative embodiment of the present invention.
Figure 11B:
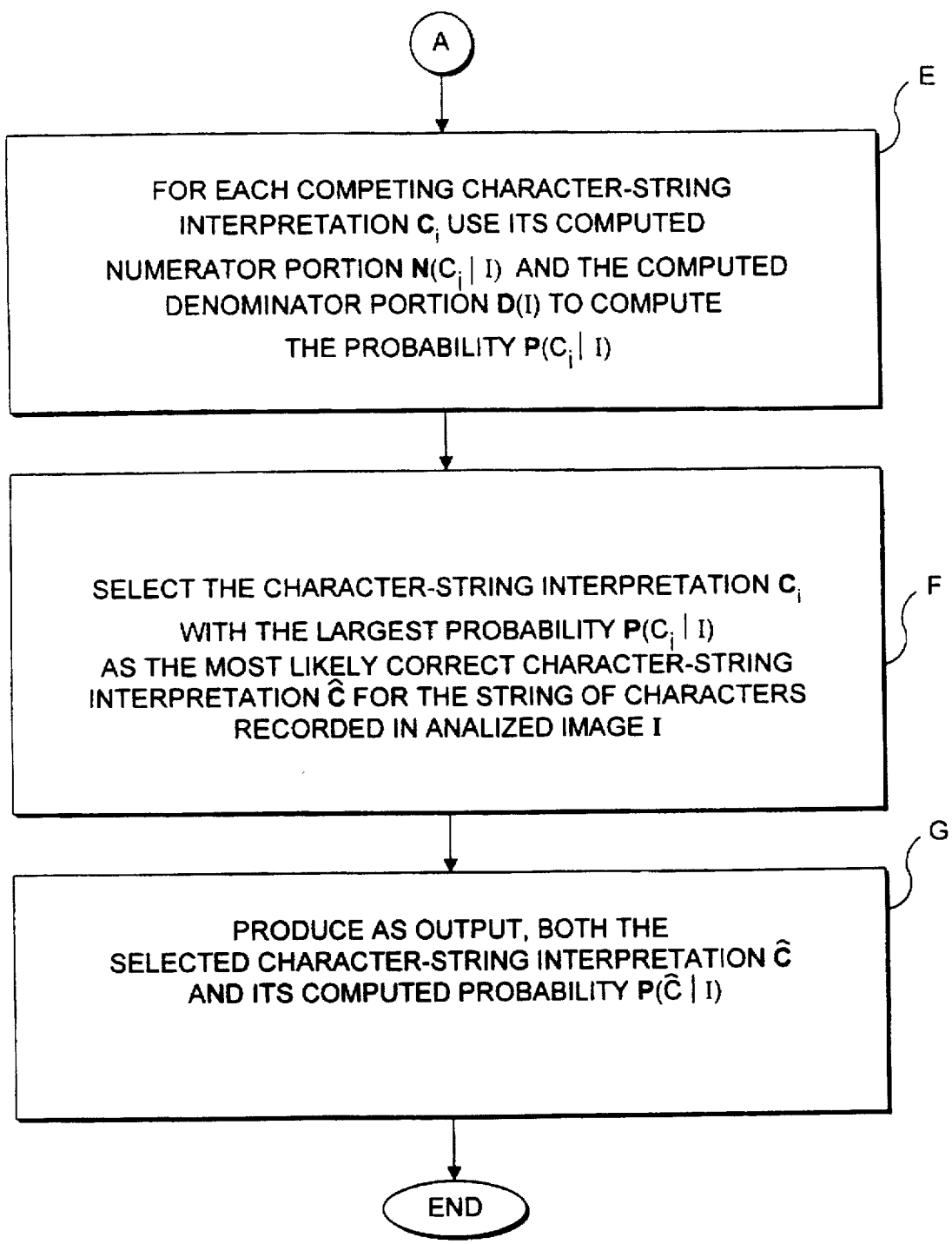

For these or other reasons, the alternative procedure set forth in the flow chart of FIGS. 11A and 11B may be used.

As indicated in Block A in FIG. 11A, the first step of this procedure also involves using the i-th neural computing network to compute the set of r-scores for each of the nodes along the i-th row in the graph. Then as indicated at Block B, the procedure uses a Beam Search algorithm to identify (as a sequence of codes representing glue arcs and recognition arcs) a relatively small set of paths through the alignment graph. Thereafter, the set of competing character-string interpretations $\{C_j\}$, corresponding to this set of paths is identified.

As indicated at Block C of FIG. 11A, the processor uses the well known Forward Algorithm to compute the denominator D(I) which serves as the denominator portion of the probability $P(C_j,I)$ for each interpretation $C_j$ in the set $\{Cj\}$ of competing interpretations. This number is stored in the main data structure. Again, the Forward Algorithm provides a precise value for the sum (over paths) of the product of the unnormalized r-scores for the arcs along each path. In the case of the denominator portion the sum runs over all possible interpretations.

To compute the scores for the identified interpretations, as indicated at Block D, the processor uses the Forward Algorithm to compute the numerator portion $N(C_j,I)$ of the probability for each competing character-string interpretation $C_j$. These numbers are then stored in the main data structure. The Forward Algorithm provides a precise value for the sum (over paths) of the product of the unnormalized r-scores for the arcs along each path.

Note that the sum computed by the Forward Algorithm is a sum over paths. One path is the path identified by the Beam Search algorithm in Block B. In fact this path produces the largest term in the sum. If one could assume that the sum is well approximated by its largest term, it would be unnecessary to perform the Forward Algorithm to evaluate the numerator; the results of the Beam Search Algorithm would suffice. This is called the "one term sum" approximation. However, the sum is not always well approximated by its largest term, and therefore it is advantageous to discard the scores computed by the Beam Search Algorithm, retain the interpretations identified by the Beam Search Algorithm, and evaluate the scores of the retained interpretations using the Forward Algorithm.

It is typically infeasible to compute the numerator for all possible interpretations, which is why it is advantageous to identify, at Block B, a relatively small set of interpretations which, because of their large "one term" scores, were expected to have large numerators, and ipso facto large probabilities.

The foregoing discussion describes the operation of the system after it has been trained. Now the learning mode of the system will be described.

In order to achieve optimal performance, the character-string interpretation system of the present invention is provided with an automatic learning mode of operation which enables the system to be automatically trained during one or more learning sessions. This mode of operation will be described in detail below with reference to Block J in FIG. 2 and the system illustrated in FIG. 9.

As illustrated at Block J in FIG. 2 and illustrated in FIG. 9, the character-string interpretation system of the present invention includes a Neural Network Parameter Adjustment Module 29 that interacts with both the graph 30 and the complex of neural computing network(s) 21 of the system shown in FIG. 9. In general, the training process of the present invention is based on the concept of supervised learning, that is, for each image I* in the training set, there is an ascribed interpretation C*. In the illustrative embodiment, the Neural Network Parameter Adjustment Module is designed to ensure that the expected (i.e., average) probability $P(C*|I*)$ for the correct character-string interpretation increases during processing all of the images I* in the training set, while the expected probability P(C|I) for each incorrect character-string interpretations decreases during the training process. In short, the objective of the learning mode, and thus the Parameter Adjustment Module, is to ensure that the average probability of wrong interpretations is minimized, while the probability for the correct character-string interpretation C is maximized. In the illustrative embodiment, log[P(C|I)] is chosen as the objective function, because the log function is steeper near zero. This causes the training process to emphasize the low-scoring pixel patterns (i.e., image segments) which is advantageous because those are the ones that are most troublesome and require the most training.

In order to realize the chosen objective function, the processor uses the gradient thereof which is expressed as:

$$\frac{\partial \log P(C|I)}{\partial w} = \frac{\partial \log P(C|I)}{\partial r} \cdot \frac{\partial r}{\partial w}$$

where $W=W_1, W_2, \ldots, W_m$ is the m-dimensional neural network Weight Vector and $r_i=r_1,r_2,\ldots,r_n$ is the i-th n-dimensional r-score vector produced as output from the i-th neural network. Typically, the weight vector w has 10,000 or more components. The r-score vector r has exactly 10 components for digit recognition. The dot product on the right hand side of the above gradient expression implies a sum over the components of r. In general, there is a gradient expression of this form for each of the neural networks, i.e., for each row in the alignment lattice. It may sometimes be advantageous to control more than one network using the same weight vector w in which case the gradient of w contains contributions from each such network. In the exemplary embodiment, as shown in FIG. 9, the Weight Vector is stored in a register 31 which provides the same Weight Vector to each and every neural network in the system.

Before beginning the multi-character recognizer training process described here, the neural net weight vector must be initialized. It can be initialized with random values according to some reasonable distribution, or it can be initialized with chosen values believed a priori to be especially suitable. In many cases, it is advantageous to temporarily disconnect the neural network from the alignment graph and to pre-train it on hand-segmented images, as if it were to be used as a single-character recognizer. The resulting Weight Vector values serve as a starting point for the multi-character recognizer training process described hereinbelow.

The left side of the gradient expression is called the System Sensitivity Vector because it is a gradient that provides information regarding the sensitivity of the output of the overall system with respect to changes in the Weight Vector w. Each component of the System Sensitivity Vector pertains to the corresponding component of the Weight Vector. Specifically, if a given component of the System Sensitivity Vector is greater than zero, a small increase in the corresponding component of the Weight Vector will cause an increase in the probability P(CI) the system assigns to the interpretation C for the image I in question. In short, the System Sensitivity Vector can be used to optimize the objective function set forth above.

For a deeper understanding of the principles underlying the training process hereof, it is helpful to appreciate the nature of the quantities comprising the gradient function.

In accordance with the above formula, the System Sensitivity Vector is computed as the dot product (vector-matrix product) of two other quantities shown on the right side of the formula. The first such quantity is a vector, $\delta \log P/\delta r$, that provides information about the sensitivity of the graph output with respect to changes in the r-scores $r_1 \ldots r_n$ provided to its input. This can be thought of as the Graph Sensitivity Vector. The second quantity is a N×N matrix $\delta r/\delta W$ that provides information about the sensitivity of the neural network outputs with respect to changes in the Weight Vector that controls all the neural networks.

For conceptual purposes only, above three terms may be thought of as being functionally interrelated as follows. During the processing of each training image I*, the evaluated Neural Network Sensitivity Matrix is used to transform the evaluated Graph Sensitivity Vector so as to produce an evaluated System Sensitivity Vector. In turn, the individual components of the evaluated System Sensitivity Vector adjust the corresponding components of the Weight Vector so that the objective function P(C*|I*) of the Parameter Adjustment Module is optimized.

In theory, the System Sensitivity Vector can be obtained by numerically evaluating the terms on the right side of the gradient function, and then performing the mathematical operation specified thereby. However, during the training session there is a simpler way of operationally evaluating the System Sensitivity Vector for each image/interpretation pair {I*,C*}. As will be explained below with respect to the flow chart in FIG. 13, the well known Backward Propagation ("Back-Prop") Algorithm can be used to evaluating the System Sensitivity Vector in a computationally efficient manner, without having to explicitly evaluate the Neural Network Sensitivity Matrix.

When the system of the present invention is operated in its learning mode, the training process of FIG. 13 is performed for each image I* in training set database, indicated at Block K in FIG. 2. Each image I* has associated with it a known character-string interpretation C*. Typically, a large number (e.g., tens of thousands) of image/interpretation pairs {I*, C*} are used to train the system during the course of particular training session. As indicated at Block B in FIG. 2, each image I* is preprocessed in essentially the same way as performed during the interpretation process of the present invention. Also, as indicated at Blocks C to E in FIG. 2, image segments and image consegmentations are constructed for image I* in essentially the same way as performed during the interpretation process of the present invention, respectively.

Then, as indicated at Block F in FIG. 2, a graph model is constructed for the generated image consegmentations and the possible character-string interpretations associated with image I*. At this stage of the training process, the training method of the illustrative embodiment exploits the following facts. Firstly, each probability P(C*|I*) has a numerator portion N(C*|I*) and a common denominator portion DI. Secondly, using the well known properties of logarithms and derivatives, the Graph Sensitivity Vector (i.e., partial derivative of log[P(C*|I*)] with respect to r-score variables, can be re-expressed as follows:

$$\frac{\partial \log P(CI)}{\partial r} = \frac{\partial \log N(CI)}{\partial r} - \frac{\partial \log D(CI)}{\partial r}$$

Importantly, the Graph Sensitivity Vector, conspicuously represented on the left side of the equality, can be easily evaluated by the procedure set forth in FIGS. 13A and 13B, as described below.

As indicated at Block A in FIG. 13A, the processor executes the Forward Propagation Algorithm once to numerically evaluate the numerator portion of the probability P(C*|I*) for the image/interpretation pair {I*,C*}, and once to evaluate the denominator portion thereof. These values are then stored. Notably, during this step of the process the Forward Algorithm exploits the fact that the graph constructed for image/interpretation pair {I*,C*}, implicitly represents the analytical (i.e., algebraic) expressions used to mathematically express the numerator and denominator portions of the associated probability P(C*|I*).

At Block B of FIG. 13A, the processor executes the well known Baum-Welch Algorithm to numerically evaluate the partial derivative of the numerator portion of the probability P(C*|I*) with respect to the variable r. At Block C, the processor uses the Forward Algorithm to compute the value of the denominator portion of probability P(C*|I*). At Block D, the processor executes the well known Baum-Welch Algorithm to numerically evaluate the partial derivative of the denominator portion of the probability P(C*|I*) with respect to the variables. Then at Block E in FIG. 13A, the processor uses the evaluated numerator and denominator portions, and the evaluated partial derivatives thereof, in order to numerically evaluate the Graph Sensitivity Vector in accordance with the formula set forth above.

Figure 13B:
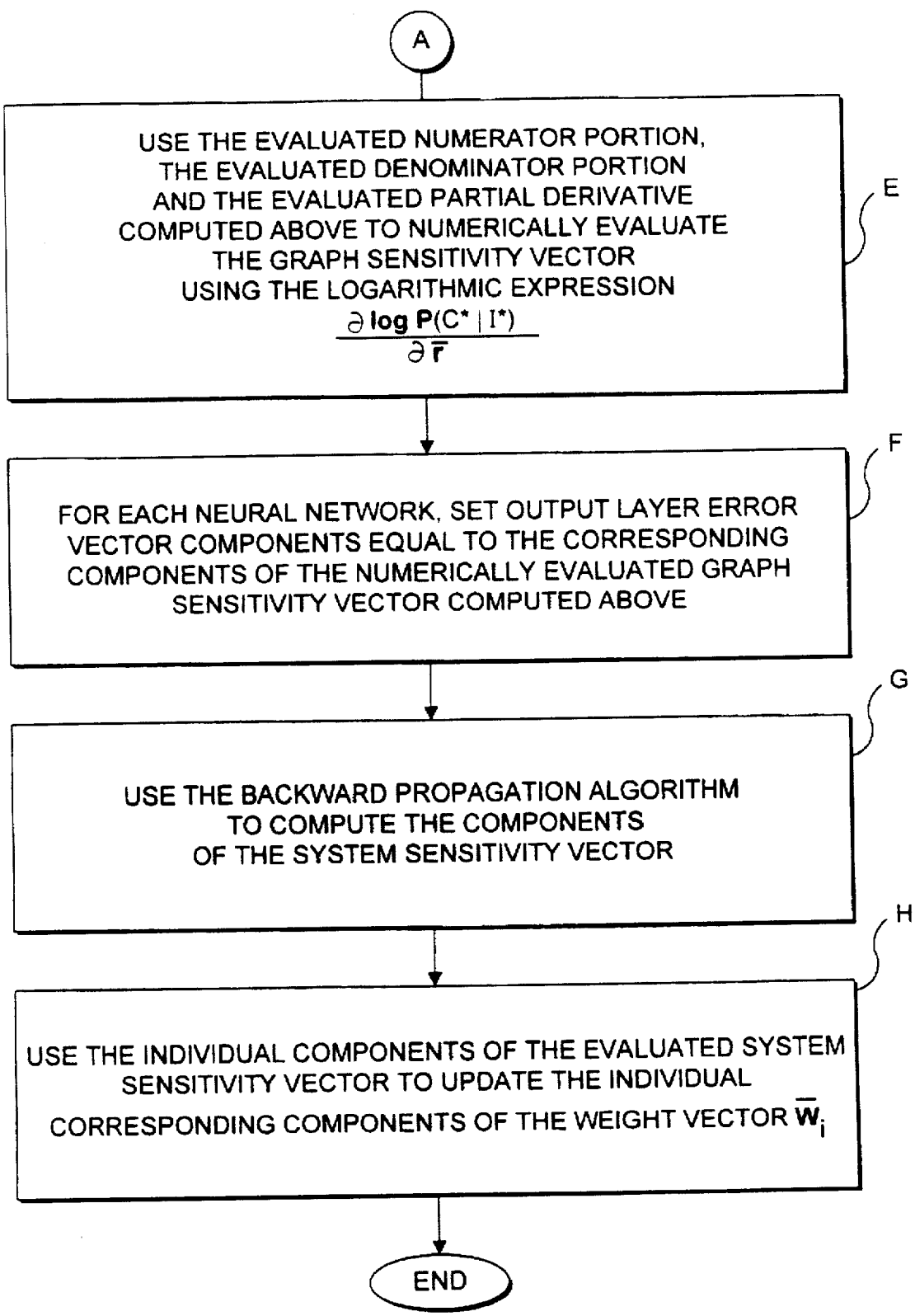

In order to efficiently evaluate the System Sensitivity Vector for the image/interpretation pair {I*,C*}, the training process then sets the output-layer gradient vector of each neural network equal to the corresponding components of the numerically evaluated graph sensitivity vector, as indicated at Block F in FIG. 13B. Then at Block G, the processor uses to Backward Propagation Algorithm to compute the components of the System Sensitivity Vector in accordance with the formula set forth above. Details of the process whereby Backward Propagation is used to compute the desired result can be found in the article "Automatic Learning, Rule Extraction, and Generalization" by Denker et al., supra.

Notably, the Backward Propagation Algorithm is not used to explicitly evaluate the Neural Network Sensitivity Matrix, but rather to evaluate the vector-matrix product of the Neural Network Sensitivity Matrix and the graph sensitivity vector. The result is an explicit evaluation of the overall System Sensitivity Vector. The latter suggests an advantageous direction in which to update each of the components in the Weight Vector of each neural network. As indicated at Block H, after the processing each image I*, the processor uses the individual components of the numerically evaluated System Sensitivity Vector to update the individual components of the Weight Vector. A preferred updating procedure is described below.

Prior to updating, each i-th component of the Weight Vector is denoted as $w_i$, and after updating, each i-th component is denoted as $w_i'$. After processing each image I*, the Weight Vector is updated in accordance with the following expression:

$$w_i' = w_i + \delta_i \frac{\partial \log P(C^*|I^*)}{\partial w_i}$$

where $\delta_i$ is the "step size control parameter", where $w_i'$ denotes the updated weight vector, and where $$\frac{\partial \log P(C^*|I^*)}{\partial w_i}$$

is the partial derivative of $\log P(I^*|C^*)$ with respect to $w_i$. In principle there are a multitude of different step size control parameters delta $\delta_i$, one for each component of the Weight Vector, but in practice it may be convenient to set them all equal. In general, the value of the step size control parameter depends on (i) the normalization factors chosen for the pixel inputs to the neural networks and (ii) the normalization factors chosen for the intermediate values of the neural networks (i.e., outputs from one layer to next layer in the neural networks), and can be reestimated during training.

In essence, there are two major concerns when selecting a suitable value for the step-size control parameter. If the selected value for this control parameter is too small, then convergence of weight vector w to its optimal value proceeds too slowly. On the other hand, if the selected value for this control parameter is too large, then there is a strong likelihood that the training process will step over and beyond the optimal value for w. This phenomenon in Weight Space W is referred to as "oscillatory divergence", which tends to deteriorate the overall quality of system performance and can completely disrupt the training procedure.

The above-described training process is repeated for each image/interpretation pair {I*.C*} in the training set. As more and more training data is processed by the system in its learning mode, the values of individual components of the neural network Weight Vector converge towards optimal values that satisfy the objective function governing the training process of the present invention. Note that during the training process there is no need to perform the Beam Search Algorithm or Viterbi Algorithm.

Once the training process has produced a satisfactory Weight Vector, the system can perform its recognition and scoring tasks without further reference to the training database. This means that in some embodiments, the training can be performed "in the lab" and the recognition and scoring can be performed "in the field". The fielded product need not have provision for storing the training database or training algorithms. In other embodiments, it may be desired that the fielded product be able to perform re-training or incremental training, in which case some provision for storing selected training examples may be needed.

Figure 12:
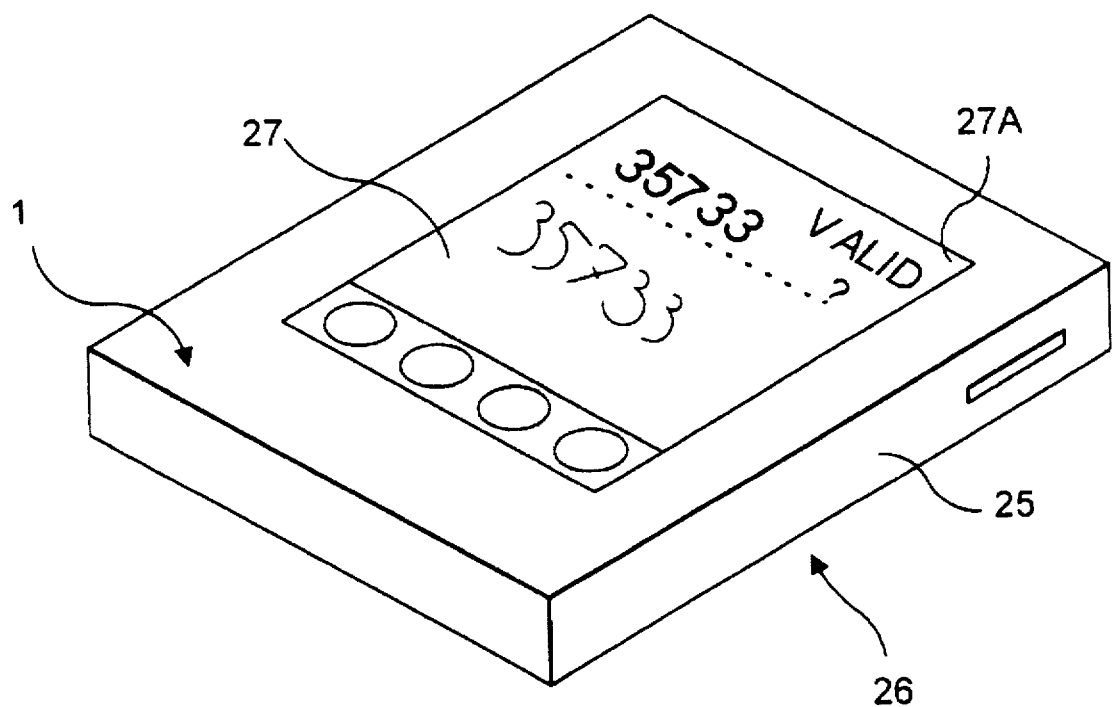
FIG. 12 is a schematic representation of hand-supportable character-string interpretation system of the present invention.

In particular, for "personal" recognizers such as depicted in FIG. 12, the performance of the system may be maximized by retraining it to accommodate the idiosyncrasies of a single user or a small set of users, based on examples they supply.

When the method and system of the present invention are realized in a portable handwriting recognition device, bit-mapped images of words, number-strings and the like, which have been validated by the user, are preferably stored in a non-volatile memory structure in the device. The function of this memory structure is to store both bit-mapped and ASCII formatted information corresponding to image/interpretation pairs {I*C*}. Over a period of use of the device, a training data set is built from such collected information.

When the training data set is of a sufficient size, the portable device can be operated in its "learning mode". In this mode of operation, the images in the training data set are processed in accordance with the training process of the present invention. After each image/interpretation pair {I*. C*} is reprocessed, the individual components of the Weight Vector are incrementally adjusted in a manner that achieves the above-described objective function.

Large classes of additional embodiments of the present invention can be readily constructed. For example, instead of preprocessed images derived from pixel information, the input to the system could be preprocessed images derived from pen stroke information, or lists (not in image form) derived from stroke information. As another example, the input could consist of preprocessed information derived from an audio signal, e.g., speech. Similarly, other forms of output can be implemented: the output symbols could represent not just digits, but also alphanumeric characters, phonemes, entire words, abstract symbols, or groups thereof. It is easy to envision applications such as decoding and error-correcting coded symbols transmitted over a noisy communication channel.

In alternative embodiments, the function performed by the complex of neural networks may be carried out by any device capable of (1) accepting an input; (2) according to a set of parameters, producing an output that can be interpreted as a score or vector of scores; (3) based on a given derivative vector, adjusting the set of parameters in a direction that will change the output in the direction specified by the derivative vector.

In alternative embodiments of the present invention, the function performed by the "alignment graph" may be carried out by a conventional dynamic programming lattice, or any device that processes sequence information in the required way, specifically: (1) accepting scores describing various entities that may be a part of a sequence; (2) efficiently identifying various high-scoring sequences and the corresponding interpretations; (3) efficiently calculating the total score for all sequences consistent with a given interpretation; and (4) efficiently calculating the sensitivity of its results to the input scores.

Also, the number of modules in the processing chain can exceed two. Each module should have (i) sensitivity outputs (if any previous module has adjustable parameters), (ii) sensitivity inputs (if it or any previous module has adjusted parameters), and (iii) ordinary data inputs and data outputs.

The probabilities discussed here need not be represented in the processor and memory by numbers between zero and one. For example, it may be advantageous to store them as log probabilities in the range between some large negative number and zero, and to adapt the computational steps describing series and parallel combinations of probabilities accordingly.

The system and method of present invention can be used to interpret input expressions that have been expressed in, on, within, or through any one of a diverse variety of medias, including for example, electrically-passive (graphical) recording medias, such as paper, wood, glass etc.;

electrically-active recording medias such as pressure-sensitive writing surfaces and touch-screen writing and display surfaces; phonological recording mediums such as human and machine-produced speech; and mediums such as air, in which pen strokes waved therein are encoded (by electrically-active non-contact schemes, e.g., RF position sensing, optical position sensing, capacitive position sensing), then transmitted, recorded and/or recognized using the system and method of the present invention. Notably, in the latter described application, it is not necessary for the sequence of symbols to be graphically represented on a surface, but rather simply expressed.

The system and method of the present invention may also be used with conventional speech recognition system. In an example of such an application, the input data set will be a recorded speech utterance (i.e., phonological signal) represented on the time domain. In accordance with the present invention, the recorded speech utterance is divided into small speech samples (e.g., speech cells), each of very short time duration. Each speech cell is preprocessed and divided into speed cells. The speech cells are then combined to form "speech segments", each containing spectral information representative of at least one phoneme in the speech utterance. These speech segments are then combined to form consegmentations which are represented using the acyclic graph of the present invention. Then using the consegmentations and the set of all possible phoneme-string interpretations, the system and method of the present invention proceed to compute the a posteriori probability for the highest scoring phoneme-string interpretation. The finer details of this speech recognition process will be readily apparent to those skilled in the speech recognition art.

It is understood that other modifications to the illustrative embodiments of the present invention will readily occur to persons with ordinary skill in the art. All such modifications and variations are deemed to be within the scope and spirit of the present invention as defined by the accompanying Claims to Invention.

What is claimed is:

1. A system for analyzing an input expression and scoring possible interpretations of said input expression, said system comprising:

segment producing means for analyzing an input data set representative of said input expression and dividing said input data set into a plurality of segments, each said segment having specifiable boundaries and being classifiable as possibly representing any one of a plurality of symbols in a predetermined symbol set, said input data set comprising a set of pixels associated with an acquired image of a graphically represented sequence of symbols, and said segment producing means analyzing said set of pixels and dividing said set of pixels into a plurality of image segments, such that each said image segment has specified boundaries and is classifiable as possibly representing any one or more of said plurality of symbols in a predetermined symbol set;

segment scoring means for analyzing each segment in said plurality of segments, and assigning a score to each possible classification of said segment associated with a particular symbol in said predetermined symbol set;

representation means for representing a plurality of possible interpretations for said input expression, and a plurality of image consegmentations, wherein each said possible interpretation consists of a different sequence of symbols selected from said plurality of symbols, and each said consegmentation consists of a different sequence of said plurality of segments;

consegmentation scoring means for assigning scores to said plurality of consegmentations based on the scores assigned to said segments;

candidate interpretation identifying means for identifying one or more candidate symbol interpretations from said plurality of possible interpretations based on the scores assigned to said plurality of segments;

symbol sequence scoring means for assigning scores to said one or more candidate interpretations based on the scores assigned to one or more of said plurality of segments;

first score evaluation means for evaluating the scores assigned to said one or more candidate interpretations;

second score evaluation means for evaluating the scores assigned to said plurality of possible interpretations; and normalized score producing means for producing a normalized score for each candidate interpretation using the evaluated score for said plurality of possible interpretations.

2. The system of claim 1, wherein said segment scoring means analyzes each image segment in said plurality of image segments and assigns a score to each possible classification of said image segment, wherein each said assigned score is associated with a particular symbol in said predetermined character set.

3. The system of claim 2, wherein said representation means represents a plurality of possible symbol sequences and a plurality of image consegmentations, wherein each said possible symbol sequence consists of a sequence of said symbols, and each said consegmentation consists of a sequence of said image segments.

4. The system of claim 3, wherein said consegmentation scoring means assigns scores to said plurality of image consegmentations based on the scores assigned to said image segments, and wherein said candidate symbol sequence identifying means identifies one or more candidate symbol sequences based on the scores assigned to said image segments.

5. The system of claim 4, wherein said symbol sequence scoring means assigns scores to said one or more candidate symbol sequences based on the scores assigned to said image segments, and wherein said first score evaluation means evaluates the scores assigned to said one or more candidate symbol sequences.

6. The system of claim 5, wherein said second score evaluation means evaluates the scores assigned to said plurality of possible symbol sequences, and said score normalizing means normalizes the scores assigned to each said candidate symbol sequence using the evaluated score for said plurality of possible symbol sequences.

7. The system of claim 6, wherein said representation means comprises a data structure representable by a graph comprising a two-dimensional array of nodes arranged in rows and columns and selectively connected by directed arcs, wherein each said column of nodes is indexed by one character position, and each said row of nodes is indexed by one said image segment in an order that corresponds to the spatial structure of said acquired image, and wherein each path extending through said nodes and along said directed arcs represents one said image consegmentation and one said possible symbol sequence, and substantially all of said image consegmentations and substantially all of said possible symbol sequences are represented by the set of paths extending through said graph.

8. The system of claim 7, wherein said each said node further comprises a set of recognition-arcs, and each said recognition-arc represents one said character and is associated with one said assigned score.

9. The system of claim 1, wherein said representation means implicitly represents said plurality of possible interpretations and said plurality of image consegmentations.

10. The system of claim 9, wherein said representation means comprises a data structure representable by a graph comprising a two-dimensional array of nodes arranged in rows and columns and selectively connected by directed arcs, wherein each said column of nodes is indexed by one symbol position, and each said row of nodes is indexed by one said segment in an order that substantially corresponds to the sequential structure of said input data set, and wherein each path extending through said nodes and along said directed arcs represents one said consegmentation and one said possible interpretation for said input expression, and substantially all of said consegmentations and substantially all of said possible interpretations are represented by the set of paths extending through said graph.

11. The system of claim 1, wherein said representation means comprises a data structure representable by a graph comprising a two-dimensional array of nodes arranged in rows and columns and selectively connected by directed arcs, wherein each said column of nodes is indexed by one symbol position, and each said row of nodes is indexed by one segment in an order that substantially corresponds to the sequential structure of said input data set, and wherein each path extending through said nodes and along said directed arcs represents one said consegmentation and one said possible interpretation for said input expression, and all of said consegmentations and all of said possible interpretations are represented by the set of paths extending through said graph.

12. A method for forming an interpretation of an input expression, where said input expression is expressed in a medium, said interpretation is a sequence of symbols, and each symbol being an element in a predetermined symbol set, said method comprising the steps:

(a) acquiring an input data set representative of said input expression, said input data set comprising a set of pixels associated with an acquired image of a graphically represented sequence of symbols;

(b) processing said input data set so as to form a set of image segments, each said image segment having specified boundaries and being classifiable as possibly representing any one or more of said plurality of symbols in said predetermined symbol set;

(c) forming a data structure that represents a set of consegmentations and a set of possible interpretations for said input expression, each said consegmentation consisiting of a set of said segments which collectively represent said input data set and being arranged in an order that substantially preserves the sequential structure of said input data set, each said possible interpretation for said input expression consisting of a possible symbol sequence, and each symbol in said possible symbol sequence being selected from said predetermined symbol set and occypying a symbol position in said possible symbol sequence, said data structure being graphically representable by a graph comprising a two-dimensional array of nodes arranged in rows and columns and selectively connected by directed arcs, each said column of nodes being indexable by one said symbol position, and each said row of nodes being indexable by one said image segment in an order that corresponds to the logical structure of said acquired input data set, and each path extending through said nodes and along said directed arcs representing one said consegmentation and one said possible interpretation for said input expression, and all of said consegmentations and all of said possible in interpretations for said input expression being represented by the set of paths extending through said graph;

(d) for each row of nodes in said graph, producing a set of scores for said predetermined symbol set represented by each node in said row, wherein the production of each said set of scores includes analyzing the segment indexing the row of nodes for which said set of scores is produced;

(e) implicitly or explicitly attributing a path score to paths through said graph; and (f) analyzing the path scores attributed to the paths through said graph in step (e) in order to select one or more possible interpretations for said input expression.

13. The method of claim 12, wherein each said node further comprises a set of recognition-arcs, and each said recognition arc represents one said predetermined symbol and is associated with one said score produced during step (d).

14. The method of claim 13, wherein step (d) comprises using a plurality of adjustable parameters to produce said set of scores.

15. The method of claim 14, wherein an information processing means characterized by said plurality of adjustable parameters, is used during step (d) for analyzing each said segment and for producing said set of scores therefor.

16. The method of claim 13, wherein step (f) further comprises: for at least said one possible interpretation for said input expression, computing a quantity corresponding to an a posteriori probability, wherein each said quantity is computed as the ratio of a numerator portion to a denominator portion, wherein the numerator portion corresponds to the sum of path scores for substantially all the paths through the graph representing one said possible interpretation for said input expression, where each said path score corresponds to the product of scores associated with the recognition arcs along one said path, and wherein the denominator portion corresponds to the sum of path scores for substantially all paths through the graph representing substantially all of said possible interpretations for said input expression where each said path score corresponds to the product of scores associated with the recognition arcs along one said path.

17. The method of claim 16, which further comprises during step (f), (1) determining the path through said graph having the highest path score, (2) identifying the possible interpretation for said input expression which is represented by the path determined in substep (1), (3) computing said quantity for said possible interpretation for said input expression identified in substep (2); and (4) providing as output, the quantity computed in substep (3) and indicia representative of the possible interpretation for said input expression identified in substep (2).

18. The method of claim 16, which further comprises during step (f), (1) determining a set of paths through said graph having a high set of path scores, (2) identifying the set of possible interpretations for said input expression which is represented by said set of paths determined in substep (1), (3) computing a set of said quantities for said set of possible interpretations for said input expression, identified in substep (2);

(4) analyzing said set of quantities computed in substep (3) so as to determine which said possible interpretation for said input expression has a high-scoring a posteriori probability; and (5) providing as output, the possible interpretation for said input expression identified in substep (2) and indicia representative of the high-scoring a posteriori probability determined in substep (4).

19. The method of claim 16, wherein each said a posteriori probability is computed as the ratio of a numerator portion to a denominator portion, and wherein step (f) further comprises, (1) determining a set of paths through said graph having a high set of path scores, (2) identifying the set of possible interpretations for said input expression which is represented by said set of paths determined in substep (1), (3) computing a set of said quantities for said set of possible interpretations for said input expression, identified in substep (2); and (4) providing as output, the set of possible interpretations for said input expression, identified in substep (2), and the quantities computed in substep (3).

20. The method of claim 14, wherein during step (d), said set of adjustable parameters specify the relationship between said segment provided to said information processing means for analysis, and said set of scores produced from said information processing means.

21. The method of claim 20, which further comprises training said information processing means by (1) processing a number of known sequences of symbols using said information processing means, and (2) for each known sequence, incrementally adjusting said set of adjustable parameters so that the probability assigned to the correct interpretation increases on the average, and the probability assigned to incorrect interpretations decreases on the average.

22. The method of claim 21, wherein said information processing means comprises a neural information processing network.

23. The method of claim 12, wherein said input expression is expressed using printed or cursive writing techniques and graphically recorded on a recording medium.

24. A system for forming an interpretation of an input expression, where said input expression is expressed in a medium, said interpretation is a sequence of symbols, and each said symbol is an element in a predetermined symbol set, said system comprising:

data set acquisition means for acquiring input data set representative of said input expression;

data processing means for processing said acquired data set so as to produce a plurality of segments, each said segment having specificable boundaries and being classifiable as possibly representing any one of a plurality of symbols in a predetermined symbol set;

consegmentation specifying means for producing data specifying a set of consegmentations, each said segmentation consisting of a set of said segments collectively representing said acquired input data set and being arranged in an order that substantially preserves the sequential structure of said acquired input data set;

symbol sequence interpretation specifying means for producing data specifying a set of possible interpretations for said input expression, each said possible interpretation for said input expression consisting of a possible sequence of symbols and each said symbol in said possible sequence of symbols being selected from said predetermined symbol set and occupying a symbol position in said possible sequence of symbols;

data storing means for storing in a data structure, the produced data representative of each said consegmentation and each said possible interpretation for said input expression, wherein said data structure is graphically representable by a graph comprising a two-dimensional array of nodes arranged in rows and columns and selectively connected by directed arcs, and wherein each said column of nodes is indexable by one said symbol position and each said row of nodes is indexable by one said segment in an order that corresponds to the sequential structure of said acquired input data set, wherein each path extending through said nodes and along said directed arcs represents one said consegmentation and one said possible interpretation for said input expression, wherein said set of consegmentations and said set of possible interpretations for said input expression are represented by the set of paths extending through said graph;

segment analyzing means for analyzing the data in each said segment, and producing, for each row of nodes in said graph, a set of scores for said symbol set represented by each node in said row;

path score computing means for computing a path score for each said path through said graph; and path score analyzing means for analyzing the computed path scores in order to select one or more said possible interpretations for said input expression.

25. The system of claim 24, wherein each said node further comprises a set of recognition-arcs, and each said recognition-arc represents one said known symbol and is associated with one said computed score.

26. The system of claim 25, wherein said path score analyzing means further comprises means for computing a quantity corresponding to an a posteriori probability for each said possible interpretation for said input expression.

27. The system of claim 26, wherein each said quantity is computed as the ratio of a numerator portion to a denominator portion, wherein the numerator portion corresponds to the sum of path scores for substantially all paths through the graph representing one said possible interpretation for said input expression where each said path score corresponds to the product of scores associated with the recognition arcs along one said path, and wherein the denominator portion corresponds to the sum of path scores for substantially all paths through the graph representing substantially all of said possible interpretations for said input expression, where each said path score corresponds to the product of scores associated with the recognition arcs along one said path.

28. The system of claim 24, which further comprises means for determining the path through said graph having the highest path score, means for identifying the possible interpretation for said input expression which is represented by said determined path having the highest path score, means for computing said quantity for each said possible interpretation for said input expression; and means for providing as output, indicia representing said computed quantity and said possible interpretation for said input expression.

29. The system of claim 28, wherein said path score analyzing means further comprises means for determining a set of paths through said graph having the highest set of path scores, means for identifying the set of possible interpretations for said input expression which is represented by said determined set of paths, means for computing a set of said quantities for said identified set of possible interpretations for said input expression, means for analyzing said computed set of quantities and determining which said possible interpretation for said input expression has the highest a posteriori probability of said highest set of path scores; and means for providing as output, indicia representing said possible interpretation for said input expression having the highest a posteriori probability, and said determined highest a posteriori probability.

30. The system of claim 26, wherein said segment analyzing means comprises a set of adjustable parameters which specify the relationship between said segment provided for analysis and said set of scores produced from said segment analysis means.

31. The system of claim 30, which further comprises system training means for training said system using a plurality of training data sets, each said training data set including an acquired data set of an input expression and a known-to-be correct interpretation for said input expression, said system training means further including parameter adjustment means for incrementally adjusting said set of adjustable parameters so that the average probability measure for said known-to-be correct interpretation increases, and the average probability measure for said set of known-to-be incorrect interpretations decreases.

32. The system of claim 26, wherein said input expression is graphically recorded on a recording medium.

33. The method of claim 32, wherein said input expression is expressed using printed or cursive writing techniques.

34. A system for forming an interpretation of an input expression, where said input expression is expressed in a medium, said interpretation is a sequence of symbols, and each said symbol is an element in a predetermined symbol set, said system comprising:

image acquisition means for acquiring an image of said input expression;

image processing means for processing said image so as to form a set of image segments, each said image segment being a sub-image of said acquired image;

image consegmentation specifying means for producing data specifying a set of image consegmentations, each said image consegmentation consisting of a set of said image segments collectively representing said acquired image and being arranged in an order that substantially preserves the spatial structure of said acquired image;

symbol sequence interpretation specifying means for producing data specifying a set of possible interpretations for said input expression, each said possible interpretation for said input expression consisting of a sequence of symbols, each said symbol in said sequence of symbol being selected from said predetermined symbol set and occupying a symbol position in said sequence of symbols;

data storage means for storing in a data structure, the produced data representative of each said image consegmentation and each said possible interpretation for said input expression, wherein said data structure is graphically representable by a directed acyclic graph comprising a two-dimensional array of nodes arranged in rows and columns and selectively connected by directed arcs, and wherein each said column of nodes is indexable by one said symbol position, and each said row of nodes is indexable by one said image segment in an order that corresponds to the spatial structure of said acquired image, and wherein each path extending through said nodes and along said directed arcs represents one said image consegmentation and one said possible interpretation for said input expression, and all of said image consegmentations and all of said possible interpretations for said input expression are represented by the set of paths extending through said graph;

image segment analyzing means for analyzing each said image segment, and producing, for each row of nodes in said graph, a set of scores for said predetermined symbol set represented by each node in said row;

path score computing means for computing a path score for each said path through said graph; and path score analyzing means for analyzing the computed path scores in order to select one or more of said possible interpretations for said input expression.

35. The system of claim 34, wherein said input expression is graphically recorded on an electrically-passive medium.

36. The system of claim 34, wherein said input expression is graphically recorded on an electrically-active medium.

37. The method of claim 34, wherein said input expression is written using printed or cursive writing techniques.

* * * * *